Figure 1:
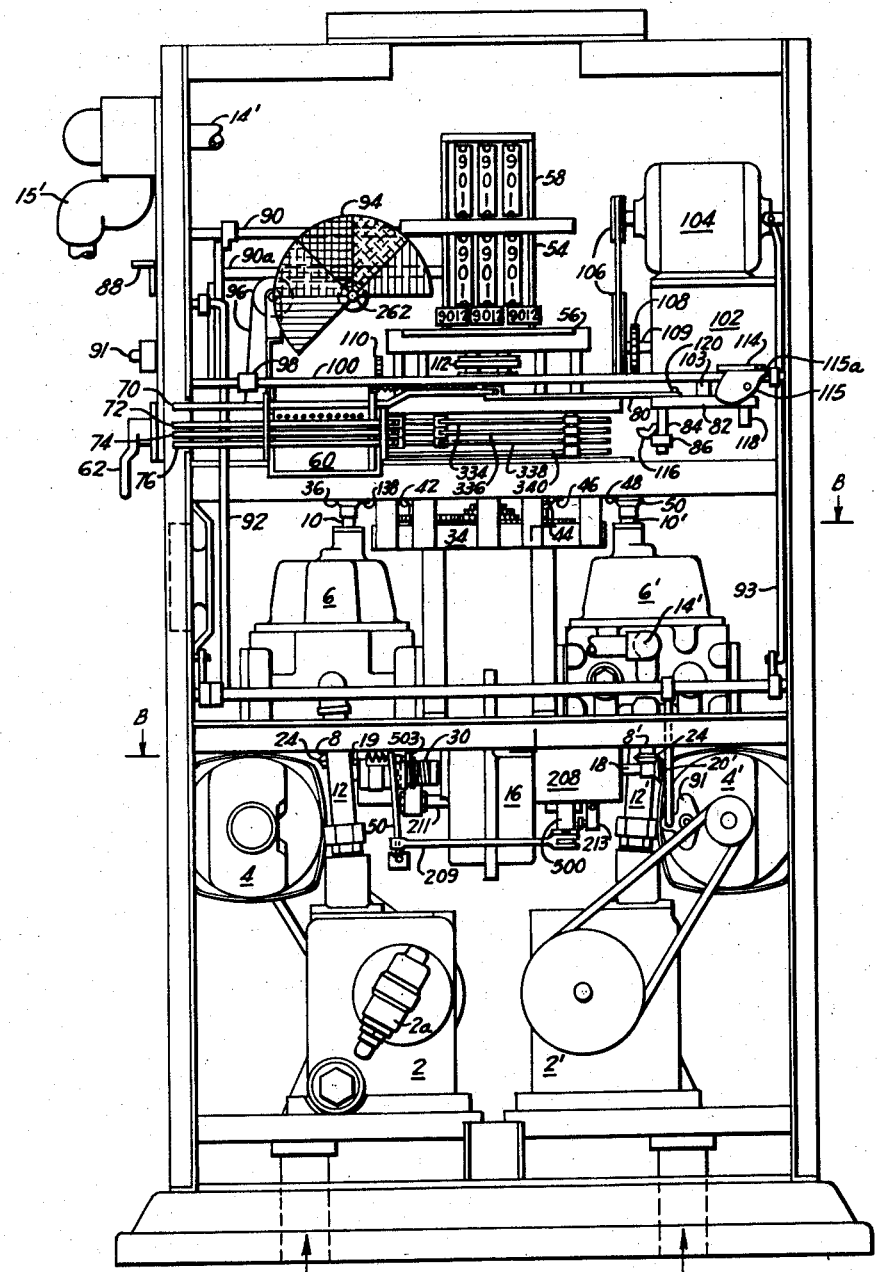

INVENTORS
JAMES H. McGAUGHEY
REHL W. SWANK

May 12, 1959  J. H. McGAUGHEY ET AL  2,886,211
APPARATUS TO DISPENSE AND PRICE DIFFERENT
LIQUIDS IN SELECTED PROPORTIONS
Filed March 15, 1957   10 Sheets-Sheet 2

INVENTORS
JAMES H. McGAUGHEY
REHL W. SWANK
BY

THEIR ATTORNEY

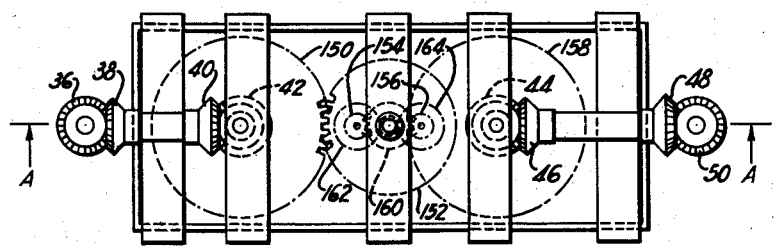
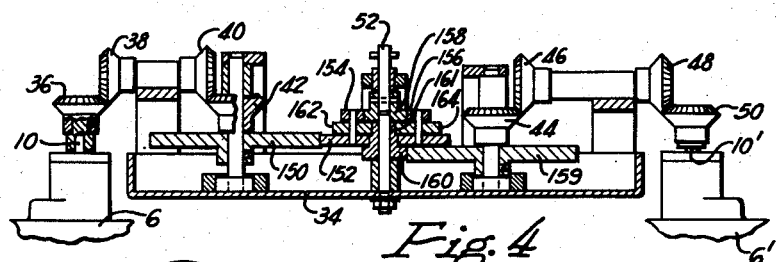
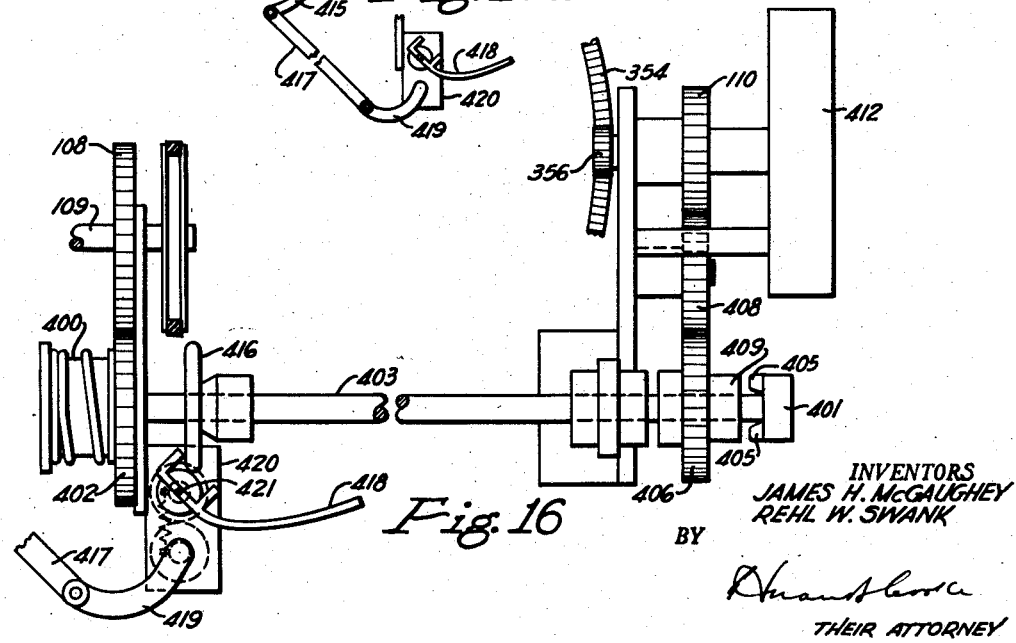

INVENTORS
JAMES H. McGAUGHEY
REHL W. SWANK
BY
THEIR ATTORNEY

INVENTORS
JAMES H. McGAUGHEY
REHL W. SWANK
BY

THEIR ATTORNEY

May 12, 1959  J. H. McGAUGHEY ET AL  2,886,211
APPARATUS TO DISPENSE AND PRICE DIFFERENT
LIQUIDS IN SELECTED PROPORTIONS
Filed March 15, 1957  10 Sheets-Sheet 6

INVENTORS
JAMES H. McGAUGHEY
REHL W. SWANK
BY

THEIR ATTORNEY

May 12, 1959  J. H. McGAUGHEY ET AL  2,886,211
APPARATUS TO DISPENSE AND PRICE DIFFERENT
LIQUIDS IN SELECTED PROPORTIONS
Filed March 15, 1957  10 Sheets-Sheet 7

INVENTORS
JAMES H. McGAUGHEY
REHL W. SWANK
BY

THEIR ATTORNEY

May 12, 1959 J. H. McGAUGHEY ET AL 2,886,211
APPARATUS TO DISPENSE AND PRICE DIFFERENT
LIQUIDS IN SELECTED PROPORTIONS
Filed March 15, 1957 10 Sheets-Sheet 8

INVENTORS
JAMES H. McGAUGHEY
REHL W. SWANK
BY

THEIR ATTORNEY

May 12, 1959 J. H. McGAUGHEY ET AL 2,886,211
APPARATUS TO DISPENSE AND PRICE DIFFERENT
LIQUIDS IN SELECTED PROPORTIONS
Filed March 15, 1957 10 Sheets-Sheet 9
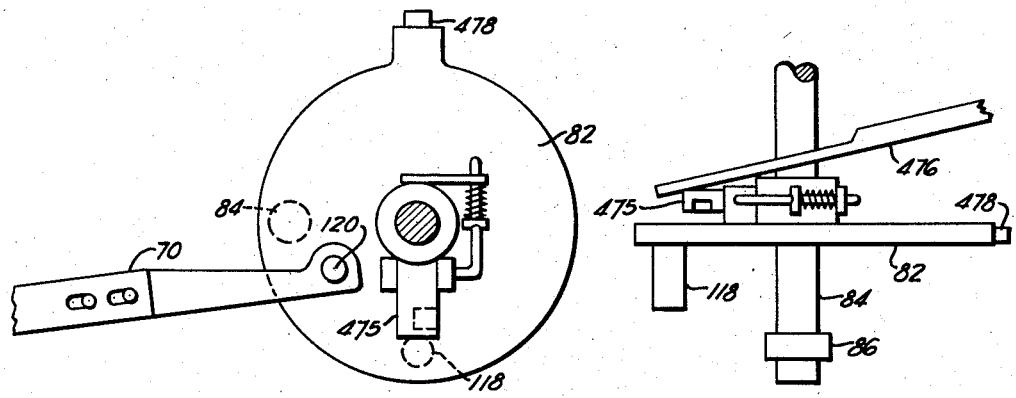
Fig. 21  Fig. 22
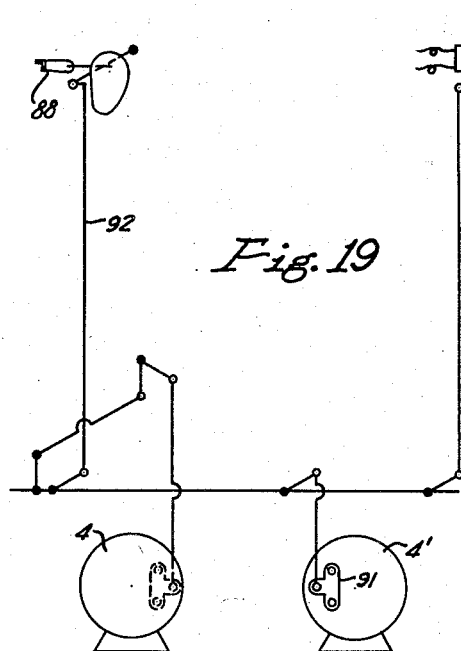
Fig. 19
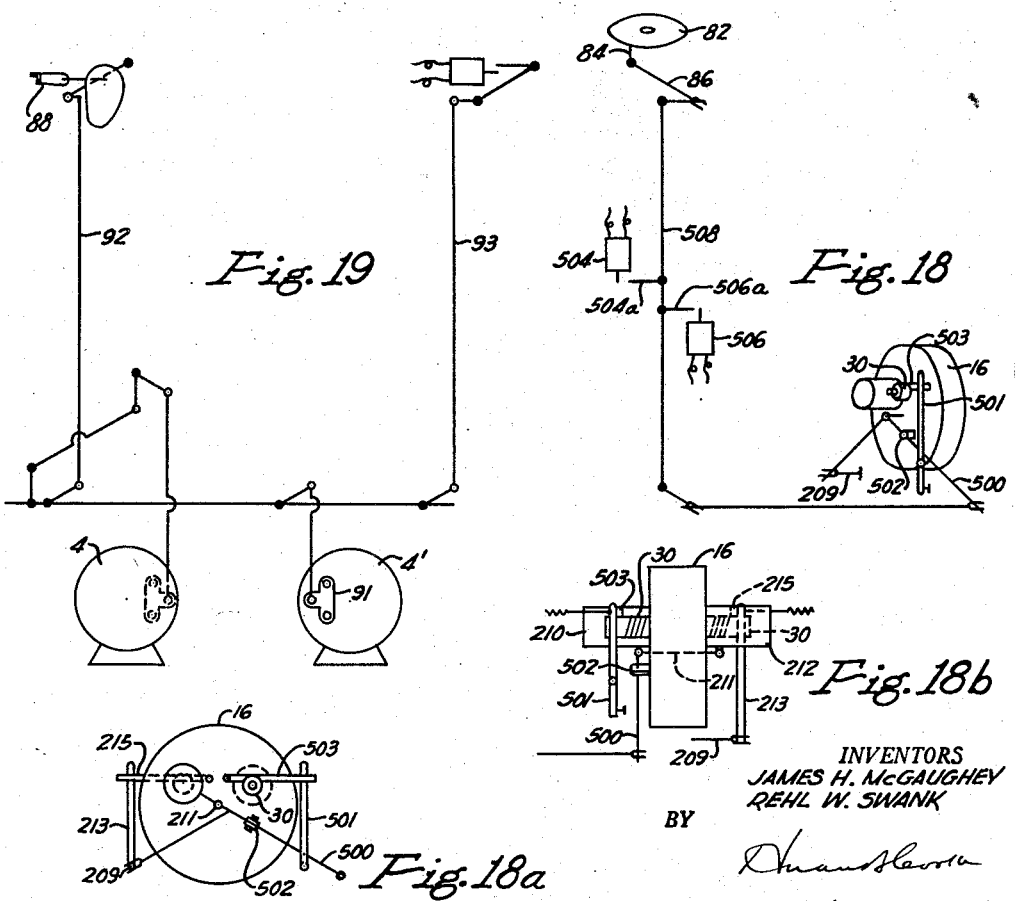
Fig. 18
Fig. 18b
Fig. 18a
INVENTORS
JAMES H. McGAUGHEY
REHL W. SWANK
BY
THEIR ATTORNEY

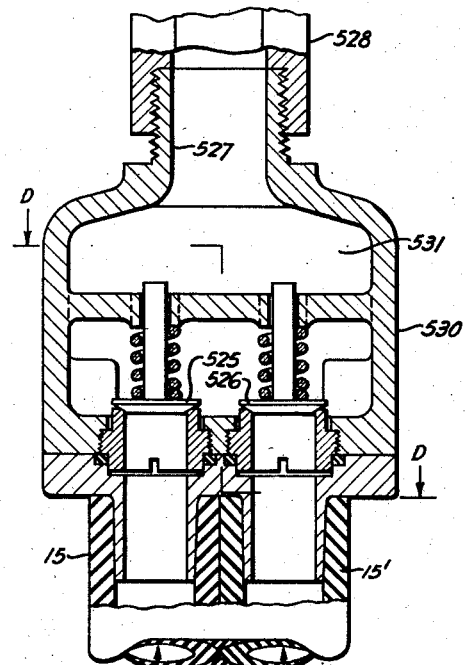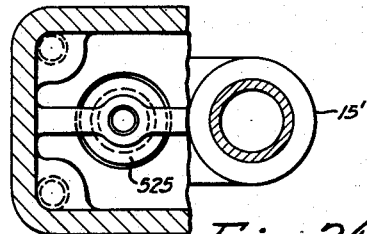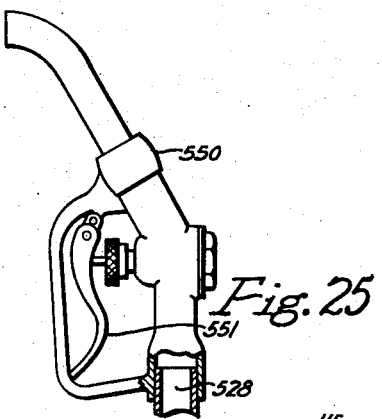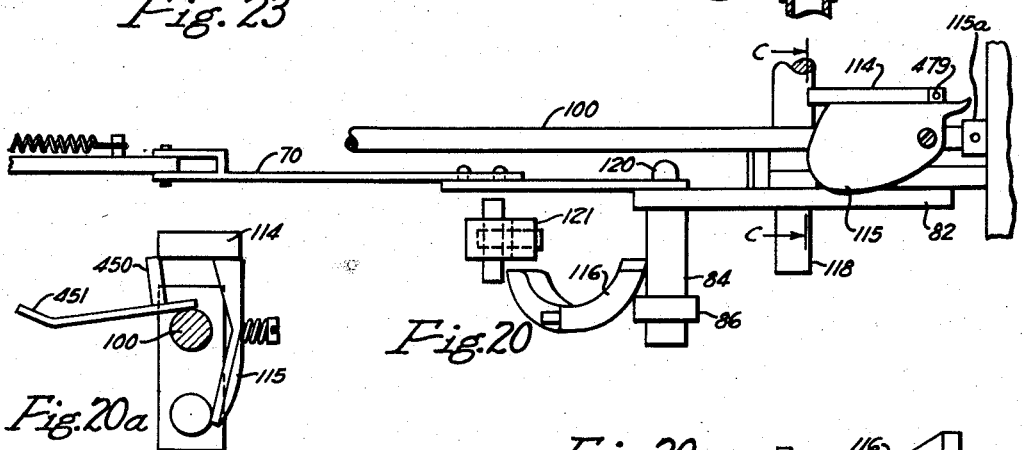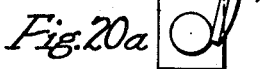

United States Patent Office 2,886,211
Patented May 12, 1959

2,886,211

APPARATUS TO DISPENSE AND PRICE DIFFERENT LIQUIDS IN SELECTED PROPORTIONS

James H. McGaughey, Erie, and Rehl W. Swank, Edinboro, Pa., assignors to Gulf Oil Corporation, Pittsburgh, Pa., a corporation of Pennsylvania Application March 15, 1957, Serial No. 646,389

18 Claims. (Cl. 222—26)

This invention relates to apparatus useful in dispensing different liquids in selected proportions. More particularly, the invention relates to improved liquid proportioning means especially adapted to dispense different gasoline stocks in varying proportions.

Various structures designed to dispense different liquids in a variety of proportions have been heretofore suggested. However, previously proposed liquid proportioning systems have been less than fully satisfactory in one or more respects. For example, an especially difficult problem is encountered in providing an automatic cost computing system involving both a flexible system for setting a unit price for each product to be dispensed and rapid unit price selection. Although it is a relatively easy matter to obtain either one without the other, to obtain both is an entirely different problem. Previously proposed systems either have not attempted automatically to compute the total cost of the respective dispensed products, or alternatively they have required that each blend of products dispensed be priced in direct proportion to the proportions of the respective component liquids in the blend and in direct proportion to the price set for the respective components. Although the desired price setting flexibility can be obtained by the use of a single, conventional, manually adjustable, pin and hole speed variator, such use would involve opening the dispensing pump housing from two or more sides and would additionally involve three separate, time-consuming, manual setting operations. By "variator" of course is meant the conventional variable transmission employed in gasoline dispensing pumps and designed to convert the rotation of a drive that is proportional to the volume of liquid dispensed into a variable output drive whose rotation is proportional to the price of the dispensed product. On the other hand, in two-component blending systems, rapid unit price setting and automatic cost computing for blends can be obtained by the use of two conventional, manually adjustable, pin and hole speed variators, the total rotations of which are accumulated in a differential gearing that drives a cost register. However, in such systems the price set for each blended product is relatively inflexible, being directly dependent upon the price set for each component liquid and proportional to the volume proportions of such liquids.

Difficulties have also been encountered in liquid blending systems in dispensing only one of the component liquids to the exclusion of the other or others. The problem involved here is that a liquid not being dispensed would normally be recycled through a recirculating bypass system during the entire period during which another liquid is delivered. Such excessive recycling is objectionable since during such periods the recycled liquid tends to be heated by the heat of fluid friction. The absorption of substantial heat by volatile liquids, such as gasoline, is objectionable since such absorption tends to cause partial vaporization of the liquid, and the usual difficulties attendant thereto, including pump cavitation, and inaccurate proportioning.

Difficulty also has been encountered in the use of blending pumps due to variation in the relative pressure differentials across different portions of the systems. While it is a relatively easy matter to calibrate and adjust a given system to deliver the desired proportions for any given pressure differential conditions, the proportions of the respective component liquids tend to vary whenever the relative pressure differentials in the respective supply lines change. In many typical liquid dispensing systems, for example, ordinary gasoline dispensing systems, the pressure differential between the dispensing nozzle and the liquid source normally will vary quite widely. Factors affecting the pressure differentials across such systems include variations in the pressure on the discharge side of the dispensing pump, which variations occur in accordance with changes in the nozzle delivery rate, which may vary substantially in ordinary service, and variations in pressure on the suction side of the dispensing pump, which variations will occur in accordance with changes in the liquid level in the tank connected to that dispensing pump.

Attempts to compensate for pressure differential changes in the respective conduit lines of liquid blending systems by means of pressure responsive control means have not been fully satisfactory, particularly at very low flow rates where the ratio of one component liquid is low with respect to the other. This is because the variations in the pressure differential on the low flow side of the system are too small to effect a proper correction. In this connection, it will be appreciated that the fluid pressure in conduits will vary exponentially with the velocity of flow. At low flow rates the pressures are quite low and the pressure variations are even smaller.

We have now found that flexibility in pricing a plurality of dispensed products containing a variety of proportions of the different liquids, as well as rapid price selection and cost computation can be achieved by providing a single variator that is responsive to means for controlling the prices for a plurality of products, irrespective of the price set for component liquids, and by providing interconnected means for concurrently controlling the liquid proportions of products to be dispensed. We have also found that accurate proportioning can be obtained at all pressure differentials and that one liquid can be dispensed to the exclusion of another without recycling the liquid not being dispensed, by cross-linking flow meters in the respective parallel supply lines of a liquid proportioning system with a mechanical connection comprising a variable transmission, and by providing clutch means operable respectively between the variable transmission and the meters, and by providing master switches adapted to control pumps that are connected respectively to the meters, and by operating the clutch means and the master switches in response to a drive train adapted to cause the variable transmission to traverse its entire range of ratios of rotation, in a manner such that clutch means between the transmission and a meter will be disconnected and such that the master switch controlling the pump connected to that meter will be opened, when the proportion of liquid passed through that meter and pump is to be nil.

Our invention, based on the above findings, includes the combination of speed variator means adapted to convert the rotation of a variable drive that is proportional to the total rotation of a plurality of flow meters to a variable drive proportional to a preselected unit price for the product dispensed, and a variable transmission connecting the meters and adapted to control the relative proportions of the liquids dispensed therethrough by controlling the relative rotations of ouput shafts of said meters. Speed variator construction useful in our invention involves a main shaft having a plurality of gears of different diameter thereon, a plurality of secondary shafts positioned adjacent to the main shaft and having gears slidable thereon, where the number of secondary shafts and slidable gears corresponds to the number of controllable digits of the unit price of the dispensed product. In association with the above structure we have provided variable means for controlling the proportions of a plurality of different liquids for a plurality of dispensed products, and variable means for controlling the unit price for each dispensed product. By virtue of the price and proportion controls provided by us, the price setting for each mixture of liquids is mechanically independent of the price setting for the respective different liquids. We have found that rapid price and proportion control are obtainable by the provision of drive means, including a drive train which, in turn, includes variator shifting means that are adapted selectively to engage the slidable gears with the gears on the main shaft. A drive means including a drive train adapted to cause the variable transmission to traverse its total range of ratios of rotation also has been provided. The price control means we have devised comprises a plurality of price controlling stop members, one for each controllable digit of the unit price of the product dispensed, wherein each such stop member is adjustable to a plurality of positions corresponding to such digits. The price control means devised by us also comprises price-control traversing means, including stop lugs, said means being adapted to traverse the possible positions of the price control stop members and adapted to engage such stop members. The price control means devised by us also comprises connecting means connecting the price control traversing means and the variator drive train, whereby the traverse of the latter is limited in accordance with the traverse of the price control traversing means.

We have found that proportion control is best effected by providing proportion control means including a proportion-control stop member adjustable to a plurality of proportions of the different liquids. As an additional part of the proportion control means we also provide proportion control traversing means including a stop lug adapted to traverse all the possible positions of the proportion control stop member and to engage this proportion-control stop member. As a further part we provide means connecting the proportion control traversing means with the drive train that is associated with the variable transmission, whereby the traverse of the variable transmission is limited by the traverse of the proportion control traversing means.

We have devised an especially advantageous variator shifting means for shifting the slidable gears of the secondary shafts in response to the variable price setting and price control means. The variator shifting means provided by us comprises a plurality of spaced, superposed annular members positioned about the main and secondary variator shafts. The annular members include a reciprocally rotatable drive ring adapted to rotate the other rings, a gear shifting ring for each secondary shaft, and an engagement-controlling ring. Means are provided for engaging the drive ring and the engagement-controlling ring and for rotating the latter with the drive ring during a portion of the travel of the drive ring. Means associated with the engagement-controlling ring are adapted to permit engagement and disengagement of the slidable gears of the secondary shafts in accordance with the direction of travel of the engagement-controlling ring. We have also provided means for disengaging the engagement-controlling ring from the drive ring during another portion of the travel of the drive ring. Further means are provided to engage the drive ring and the gear shifting rings and to rotate the latter with the drive ring during the other portion of travel of the drive ring. An inclined plane, associated with and normal to each of the gear shifting rings, each such inclined plane being adapted to engage one of the slidable gears, is provided in order to cause the slidable gears to slide along the secondary shafts in relation to the relative positions of the inclined planes during rotation of the gear shifting rings. The traverse of the respective gear shifting rings, and consequently of the slidable gears, is limited by the aforesaid means connecting the price control traversing means and the respective rings of the variator gear shifting means that comprise a portion of the variator drive train. Means are also provided for returning the drive ring and gear shifting rings and the engagement-controlling ring to their original positions, whereby the return motion of the engagement-controlling ring permits engagement of the slidable gears with selected gears of the main speed variator shaft.

An especially advantageous variable transmission for cross-linking the meters is of the infinitely variable type and involves first and second rotatable shafts adapted to be driven by output shafts from the meters. A pulley wheel is axially mounted on each shaft. Belt means is provided connecting the pulley wheels. One side of each pulley wheel is movable relative to the other, whereby the pitch diameter of each pulley wheel is adjustable. Means are also provided for inversely varying the pitch diameters of the pulley wheels and the ratio of revolutions of said first and said second shafts. We have found that one liquid can be dispensed to the exclusion of the other or others without excessive recycling of liquid by the provision of normally engaged clutch means operable between the variable transmission and meter output shafts associated therewith, and by the additional provision of normally closed master switch means controlling the pumps connected to such meters, together with means operatively associated with the proportion selecting means for disengaging said clutch means and a meter associated therewith and for opening the master switch means controlling the pump connected with the disengaged meter, when the proportion of liquid dispensed through that meter and pump is to be nil.

We have found that individual elements of the above described structure as well as combinations of two or more of such elements find particular utility when employed in combination with liquid dispensing apparatus including a dispensing nozzle and means for supplying selected proportions of different liquids to the nozzle comprising first and second meters, each provided with an output shaft whose rotations are proportional to the volume of liquid dispensed therethrough; first and second pumps, each pump being provided with a pressure-relief operated recirculating bypass system; conduit means connecting the nozzle with the respective meters and pumps; a cost register and a volume register.

Figure 2:
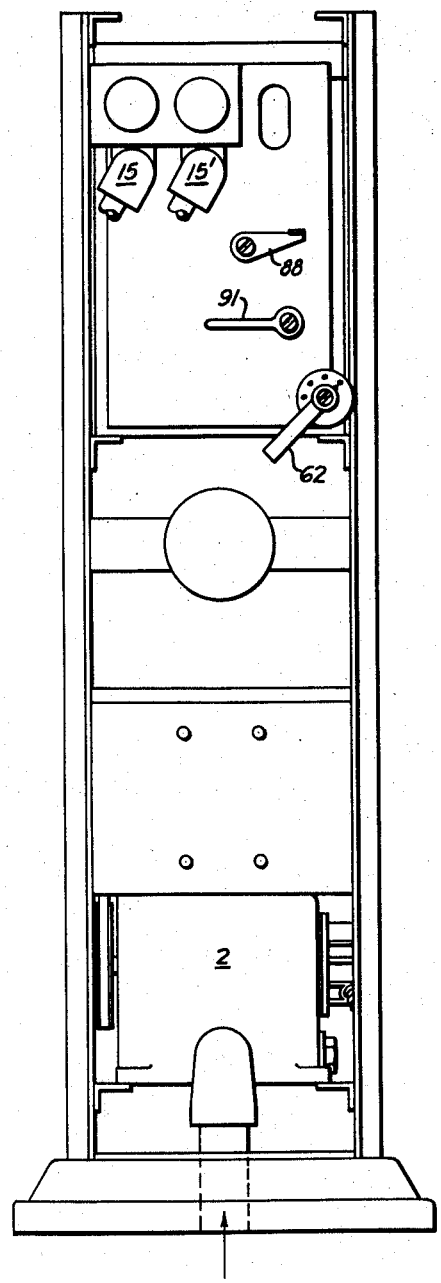
Figure 13:
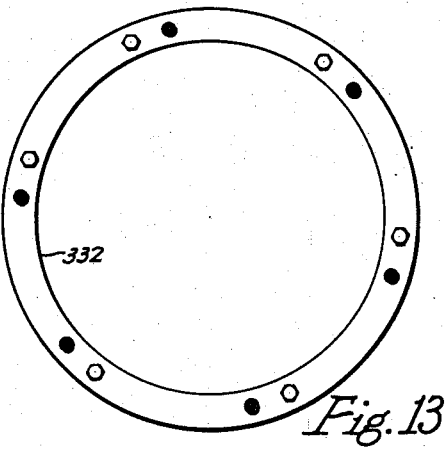
Figure 14:
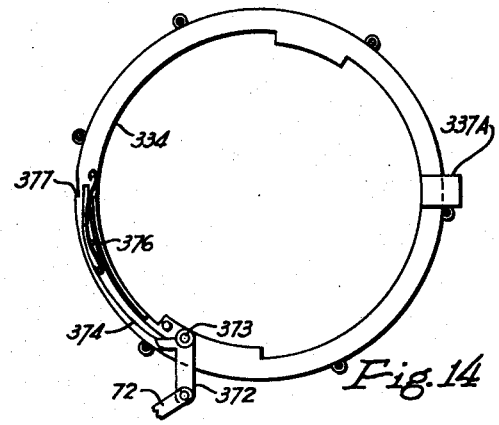
Figure 15:
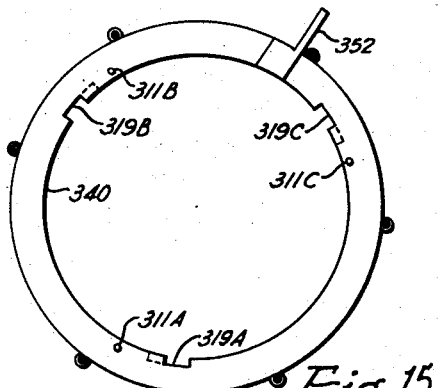
Figure 5:
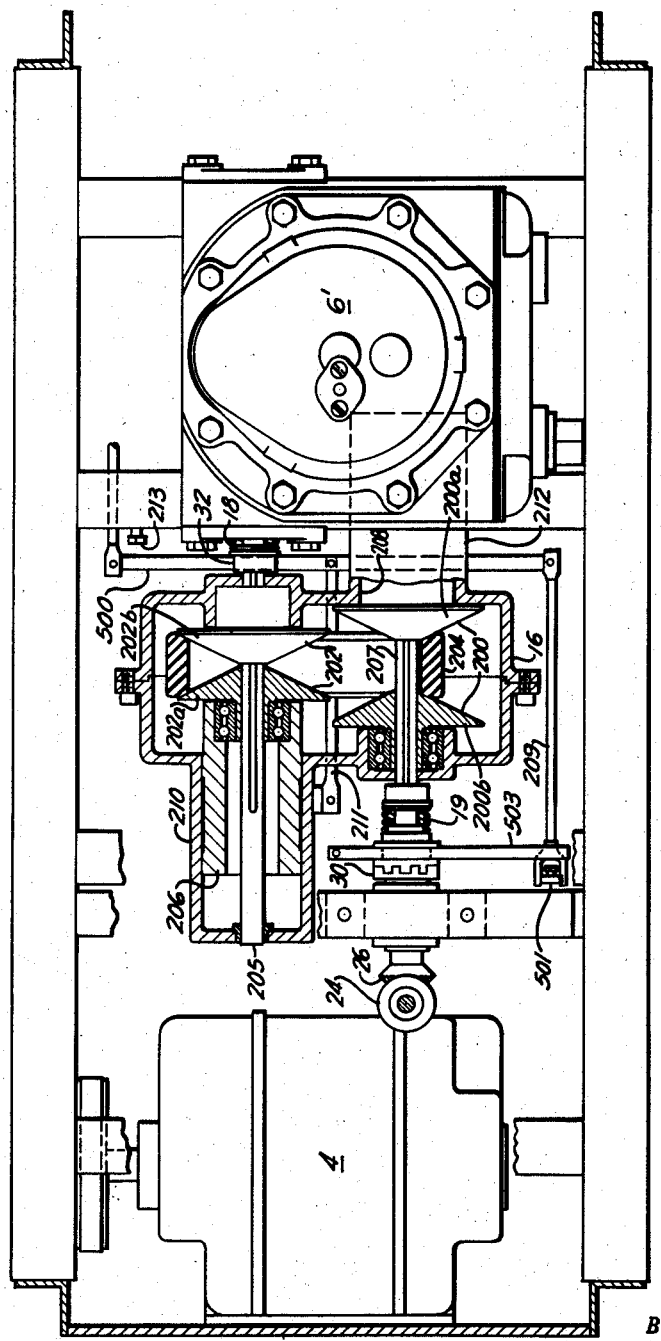
Figure 6:
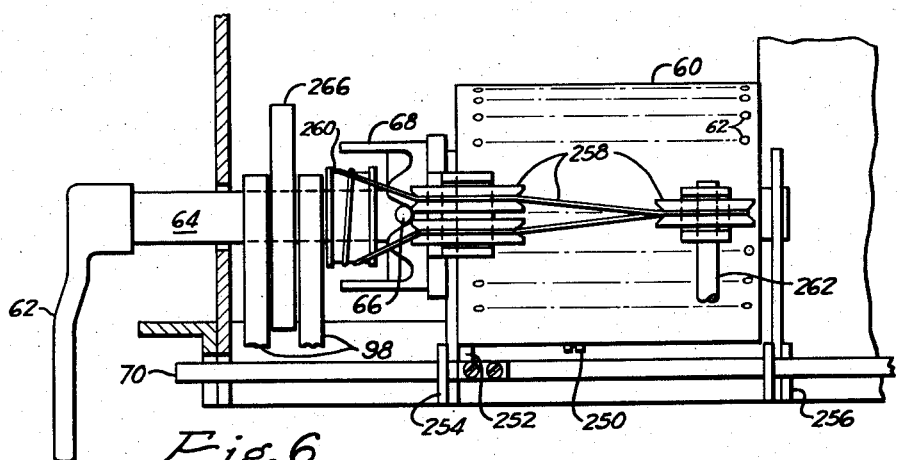
Figure 7:
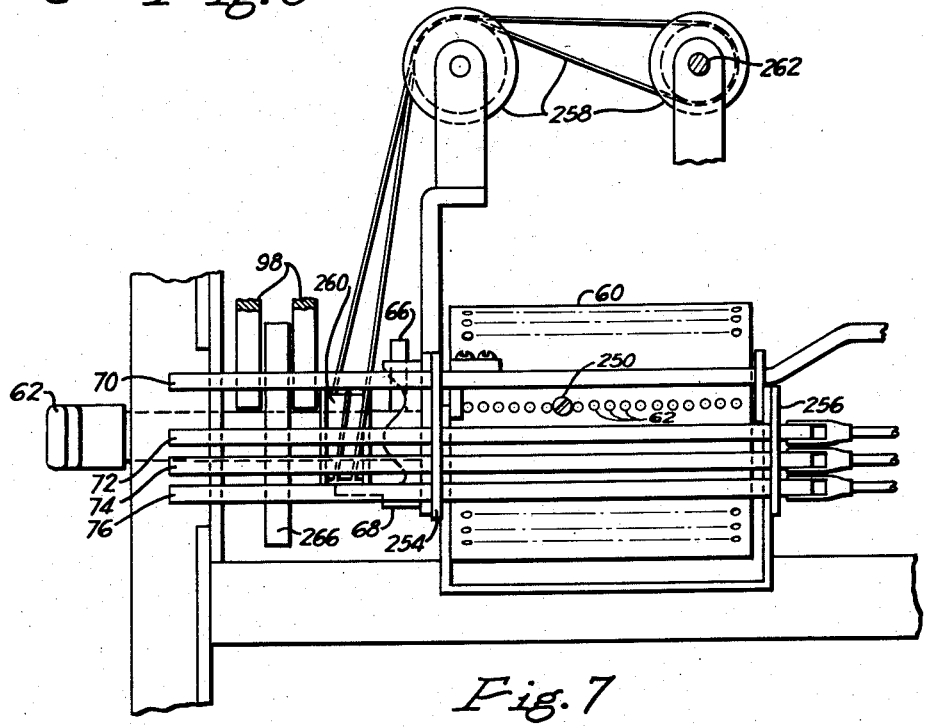
Figure 8:
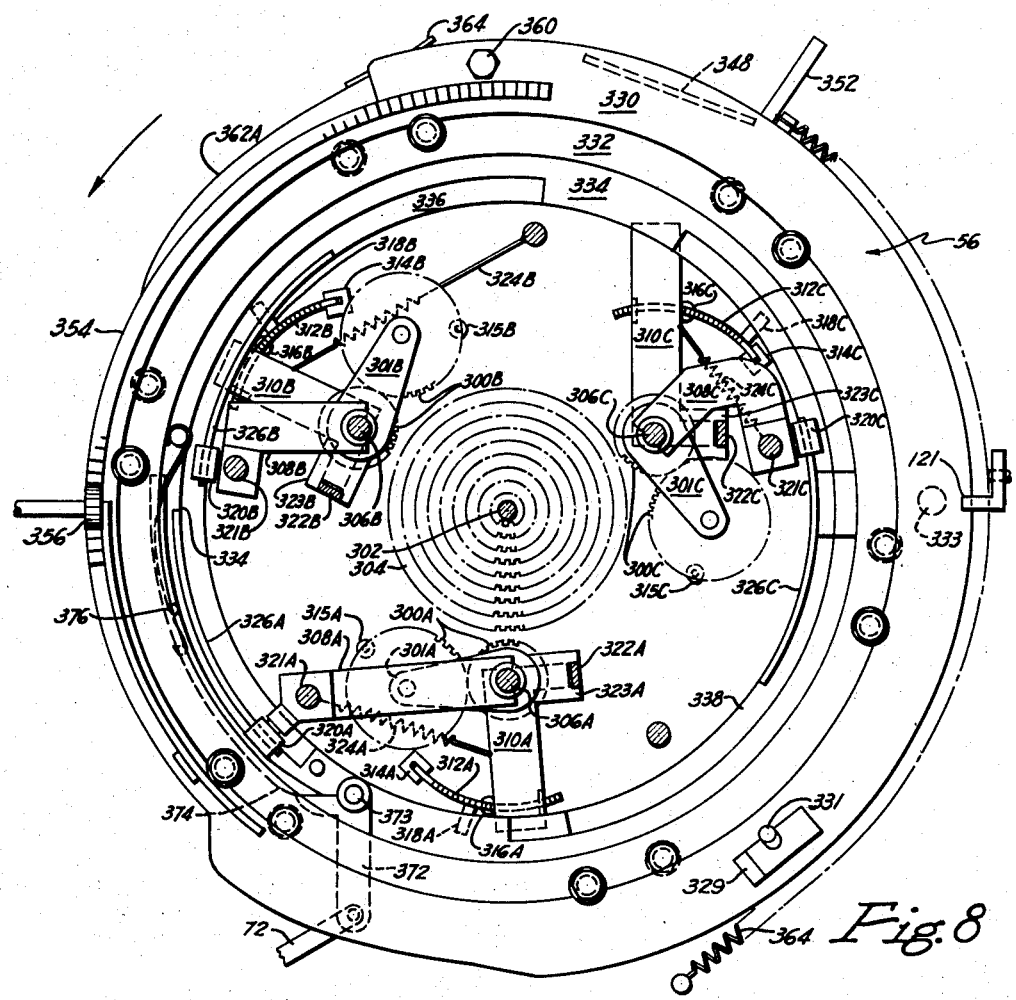
Figure 10:
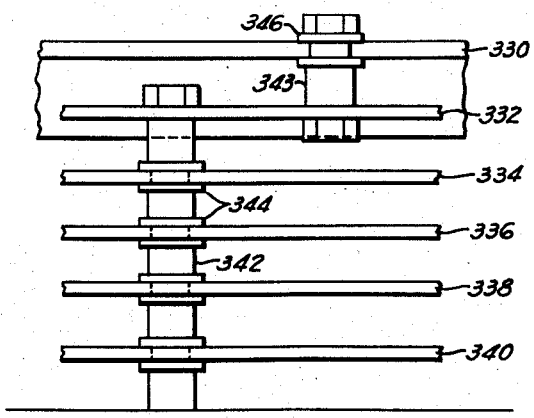
Figure 9:
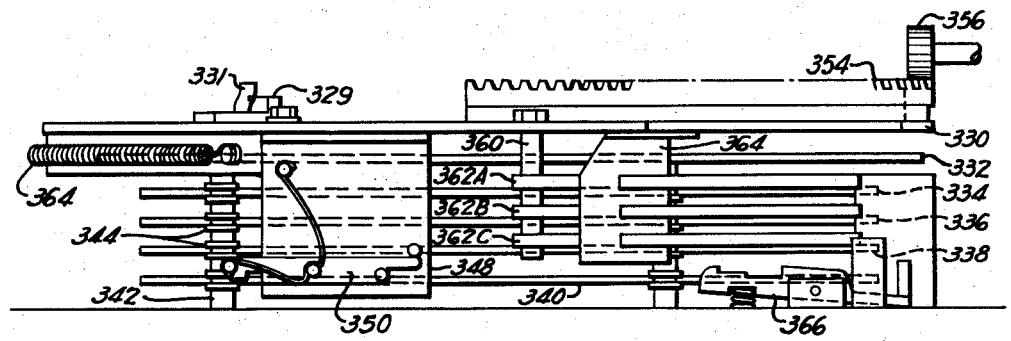
Figure 17:
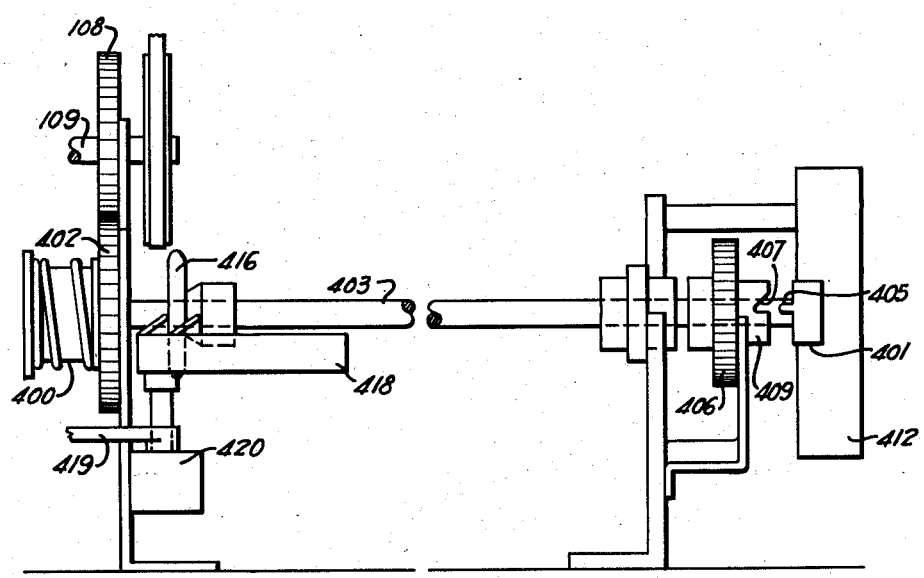
Figure 11:
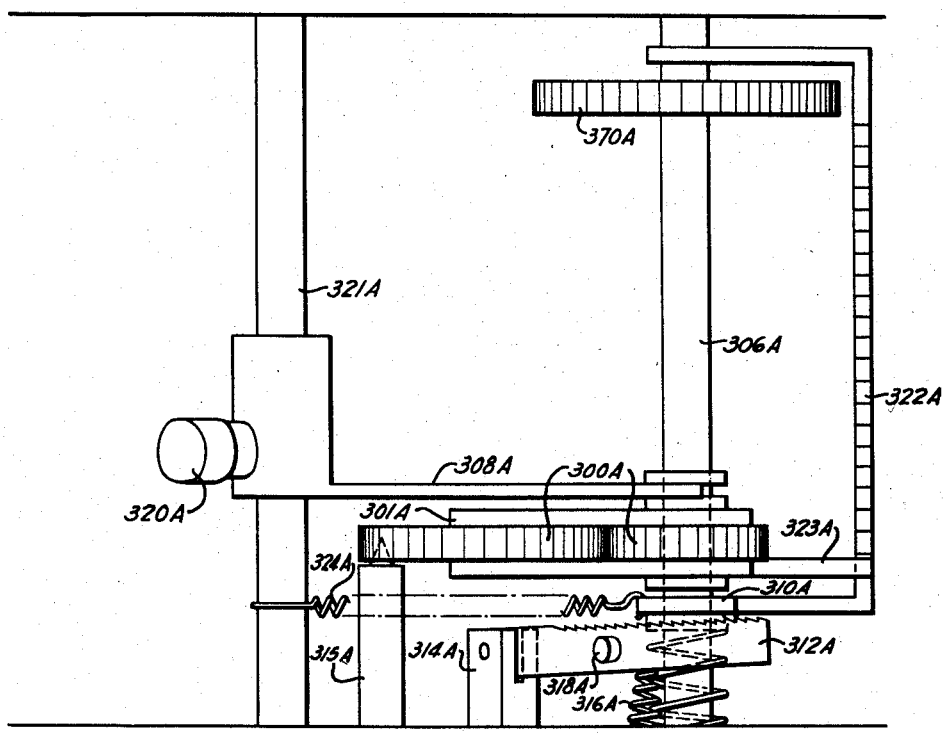
Figure 12:
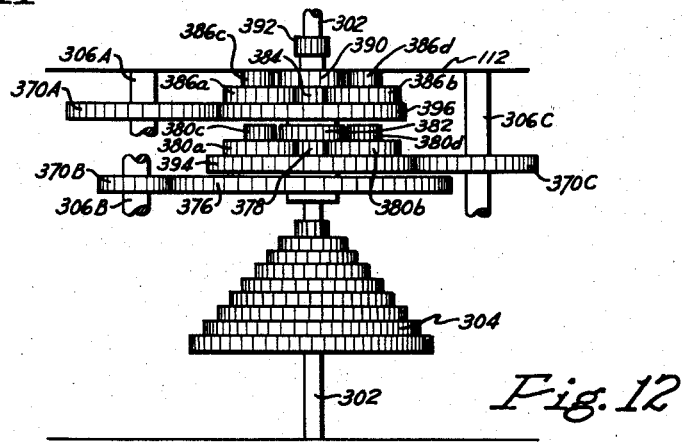

Referring now briefly to the drawings, Figure 1 is a front elevation of a preferred modification of the dispensing apparatus of this invention, having the housing removed to reveal parts that are normally concealed, and showing the relative locations of the principal elements of said apparatus. Figure 2 is a view in elevation of the left side of the structure shown in Figure 1. Figure 3 is a plan view of differential gearing means for accumulating the total rotations of output shafts of the meters of Figure 1. Figure 4 is a front elevation, partly in vertical section along the line A—A, of the structure of Figure 3. Figure 5 is a plan view of the structure of Figure 1, taken in horizontal section along the line B—B, and showing the details of the preferred variable transmission means connecting the two meters. Figures 6 and 7 are respectively an enlarged plan view and a front elevation of the price and proportion control means shown in the upper left-hand portion of Figure 1. Figure 8 is an enlarged plan view, partly in section, of the preferred speed variator means shown in the upper central portion of Figure 1. Figure 9 is a side elevation of the structure of Figure 8. Figure 10 is a fragmentary view of a portion of the structure of Figure 8. Figure 11 is a view in elevation of a typical member of the group of slidable gear means that are mounted on the secondary shafts adjacent the main shaft of the speed variator of Figure 8. Figure 12 is an enlarged elevational view of the main shaft and associated gearing of the variator of Figure 8, together with differential gearing adapted to accumulate the total rotations of the secondary shafts of the variator. Figure 13 is a plan view of a drive ring support member positioned immediately beneath the top or drive ring member of the gear shifting means of the variator shown in Figures 8 and 9. Figure 14 is a plan view of one of the three similarly constructed, intermediately positioned gear shifting rings of the gear shifting means of the variator of Figures 8 and 9. Figure 15 is a plan view of the bottom, or engagement-controlling, ring of the variator shifting means of Figures 8 and 9. Figure 16 is a plan view, partly broken away, of the means for driving the gear shifting means of the variator of Figures 8 and 9. Figure 16a is a fragmentary top view of means for engaging the drive means of Figure 16. Figure 17 is a rear elevation of the structure of Figure 16. Figure 18 is an isometric view showing schematically the mechanical linkage or drive train between the crank plate and variable transmission of Figure 1. Figures 18a and 18b are fragmentary left side and front views showing the details of the lever linkage and pivot of the variable transmission of Figure 18. Figure 19 is an isometric view showing schematically the mechanical linkage of the motor interlock system of the apparatus. Figure 20 is an enlarged front view of a portion of the switch rod assembly shown in Figure 1, together with associated mechanism. Figure 20a is a sectional view of a portion of the structure shown in Figure 20, taken along the line C—C. Figures 20b and 20c are, respectively, top and side views of a lever seen in end elevation in Figure 20. Figures 21 and 22 depict top and side views of a crank plate and associated structure shown in Figure 20. Figure 23 illustrates an adapter means, in vertical section, adapted to connect parallel liquid dispensing hoses to a manually-controlled dispensing nozzle. Figure 24 is a horizontal sectional view of the adapter of Figure 23, taken along the line D—D. Figure 25 is a side elevation of a conventional, manually-controlled dispensing nozzle. It will be understood that in the interest of simplicity some of the structure shown in the various figures of drawing has been shown somewhat schematically, and that numerous structural details, electrical wiring, and the like, either known or obvious to one skilled in the art, have been omitted.

Referring now in greater detail to the structure shown in the drawings and particularly to that shown in Figures 1 and 2, the letters X and X' refer to separate sources of two different liquids, for example, gasoline stocks having relatively different octane ratings, to be dispensed in predetermined proportions. Numerals 2 and 2' denote first and second, rotary, positive displacement pump means, each including integrally therewith an air eliminator and a pressure-relief operated recirculating bypass system. Numeral 2a refers to the housing of the pressure relief valve of the recirculating bypass system of pump 2. It is of course not essential to the invention that the pump means, air eliminator means, and bypass system be constructed in an integral housing. Accordingly, expressions such as "each pump being provided with a pressure-relief operated recirculating bypass system" and the like, as used herein, are intended to include integral or separate structures.

Numerals 4 and 4' denote first and second electric motor means for driving pump means 2 and 2'. Numerals 6 and 6' refer to first and second reciprocating piston, displacement type meter means for measuring the volume of flow of the respective, dispensed liquids. It will be appreciated that in the interest of space economy, the pumps, motors and meters shown in Figure 1 are oriented in reverse fashion.

Numerals 8 and 8' and 10 and 10' refer respectively to output shafts for meters 6 and 6', the rotations of which are each proportional to the volume of liquid passed therethrough. Although in the illustrated device each meter has been shown as being provided with two output shafts in order to reduce the total load that would otherwise be placed on each shaft, such structure is not essential to the invention in its broad forms. If desired, the herein disclosed dispensing apparatus can be designed to utilize the conventional, single output shaft (shafts 10 and 10') on each meter. In view of the foregoing, the expression "meter output shaft" and the like as broadly used herein is intended to refer to the single meter output shaft of meters having but one such shaft and to either shaft of meters having more than one output shaft.

Numerals 12 and 12' refer to conduit means connecting respectively pump 2 with meter 6 and pump 2' with meter 6'. Numeral 14' designates a conduit, broken away, connecting meter 6' to hose inlet 15'. An outlet is provided on the opposite side of meter 6, corresponding to the outlet of meter 6', which is connected to hose inlet 15 (Figure 2) by a conduit (not shown) corresponding to conduit 14'.

The pumps, motors and meters shown in the drawings and referred to elsewhere herein have not been illustrated in detail, since they are substantially conventional in the gasoline dispensing pump art, and, as such, do not constitute the essence of this invention. Except for the incorporation in the meters of supplemental output shafts 8 and 8', the conventional structures referred to above are those included in the gasoline dispensing pumps marketed by the Erie Meter System, Inc., of Erie, Pennsylvania.

Numeral 16 denotes a variable transmission means connecting meters 6 and 6' and adapted to control the relative proportions of liquids passed therethrough by controlling the relative rotations of meter output shafts 8 and 8'. Shafts 18 and 19, including intermediately disposed clutch means 30 and 32 (Figure 5), of variable transmission 16 are connected to meter output shafts 8' and 8, respectively, by means of meshing bevelled gears, of which gears 24 and 20' and 24' are shown.

Differential gearing, adapted to accumulate the total rotations of meter output shafts 10 and 10', and thereby to produce a variable drive proportional to the volume of liquid dispensed through said meters, is designated by numeral 34. Differential gearing 34 is operatively associated with meter output shafts 10 and 10', respectively, through bevelled gears 36, 38, 40 and 42, and 44, 46, 48 and 50. The differential gearing 34 is adapted to drive a quantity register 54 through output shaft 52 (Figure 4) and shaft 302 (Figure 12), said quantity register 54 being adapted to register the total volume of liquid dispensed.

Speed variator means is designated by numeral 56. The speed variator means is also driven by differential gearing output shaft 52 and shaft 302, and is adapted to produce a variable drive proportional to a preselected price for the product being dispensed. Numeral 58 denotes a cost register that is driven by the speed variator means 56. Cost register 58 is adapted to register the total cost of the volume of dispensed liquid.

The combined quantity and cost registers 58 and 54 can be of any suitable structure and as such do not comprise the essence of this invention. For this reason, this portion of the apparatus has not been illustrated in detail. In the interest of clarity it may be mentioned that the registers disclosed herein can be of the construction disclosed in U.S. Patent No. 2,264,557 to E. A. Slye. The actual register mechanism depicted in the drawings is marketed by Veeder-Root, Inc., of Hartford, Connecticut.

Drum 60, selector handle 62, and stop pins or screws 250 (Figure 6) and other structure associated with drum 60 constitute variable proportion and price control means for presetting and selecting prices and proportions for the various dispensed liquids. Drum 60 is of a size such that the proportions and prices for several dispensed products can be preset thereon in a manner described in detail elsewhere herein. Selector handle 62 is operatively associated with drum 60 through shaft 64. Pin 66 mounted on shaft 64 together with notched, flanged disc 68 constitute locking means for locking drum 60 in any preselected position corresponding to a given product and price.

Speed variator means 56 is operatively associated with and responsive to the price setting and selecting means and in particular to the stop screws mounted in holes on the surface of drum 60, through price control rods 72, 74 and 76, which constitute price control traversing means. Variable transmission 16 is associated with and responsive to a stop screw mounted in a hole on the surface of drum 60. The connection between means 16 and drum 60 is by way of the train comprising proportion control rod 70, which constitutes proportion control traversing means, connecting rod 48 pivotally mounted on one end on rod 70 and having its other end resting on rotating crank plate 82, follower member 475 (Figure 21), crank plate 82 itself, pin 84 mounted near the outer edge and beneath crank plate 82, lever 86, and the balance of the mechanical linkage or drive train shown in detail in Figure 18.

Referring now to miscellaneous elements in the apparatus illustrated in Figure 1 and not previously identified, numeral 88 refers to a reset lever which is associated with cost register 58 and volume register 54, respectively, through shafts 90 and 90a. This lever is adapted to reset the respective registers to zero after each sale. By means of an interlock system, partly illustrated, a new sale cannot be made until the registers are reset to zero.

Dispensing motors 4 and 4' are caused to operate by operating handle 91, which is associated with the motor switches through mechanical interlock linkage 92. A portion of the same linkage 93 also serves to open a master switch in the power line to motor 104, thus preventing any change in the liquid proportions or product price while the pumps 4 and 4' are operating.

Numeral 94 denotes a blend selector dial, rotatable with shaft 262 and divided into several segments, each segment having a different color representing a different dispensed product. Blend selector dial 94 is rotated in conjunction with blend selector handle 62 and shaft 64 associated therewith by means of a connecting cable and pulley system 96. Switch rod 100 is adapted to start motor 104 through the camming action of hinged cam 114 upon a pin 450 (Figure 25), associated with switch rod 100 near its righthand end, when switch rod 100 is caused to move toward the cam. Switch rod 100 is associated with shaft 64 and a plate 266 (Figures 6 and 7), axially mounted on shaft 64, through a fork 98 mounted at its base on switch rod 100. Crank plate 82 is mounted on the output shaft 103 of speed reducer 102 and is rotatable therewith. Speed reducer 102 in turn is driven by motor 104 through belt and pulley linkage 106. Numeral 108 refers to a gear mounted on input shaft 109 of speed reducer 102 and forming a portion of the drive train adapted to drive the variator shifting means. Gear 110 constitutes another portion of the aforesaid drive means. Gears 110 and 108 are associated through the mechanism shown in detail in Figures 16 and 17. Numeral 118 refers to a pin, mounted on the lower surface of crank plate 82 near its periphery, that is adapted to engage a lever 415 (Figure 16a), that is linked to spring-loaded, snap-acting pivot means 420, thus pivoting fork 418 and causing engagement of the variator drive train. Pin 118 is also adapted to depress the near end of lever 116, Figure 20, thereby elevating the opposite end and causing lever 121 to pivot.

Referring now in greater detail to Figures 3 and 4, there is shown a conventional planetary differential gearing mechanism 34 adapted to produce a variable drive in output shaft 52 that is proportional to the total volume of liquid passed through meters 6 and 6' and to the total rotations of meter output shafts 10 and 10'. The rotations of meter shaft 10 are transmitted to shaft 52 through a train including bevelled gears 36, 38, 40 and 42, spur gear 150 coaxially mounted on the same shaft as bevelled gear 42, meshing gear 152 and integral planet gears 162 and 154, and 164 and 156, and thence to meshing gear 158 mounted on shaft 52. The rotations of meter shaft 10' are transmitted to output shaft 52 by means of a train including bevelled gears 50, 48, 46, 44, spur gear 159 coaxially mounted on the same shaft with bevelled gear 44, meshing gear 160 and integral gear 161, integral planet gears 162, 154, and 164, and 156 and thence to gear 158 mounted on shaft 52. The gear ratios of the respective gear trains are such that the revolutions passed into shaft 52 by each gear train will each be in the same ratio with the revolutions of the respective meter shafts.

Referring to Figure 5, there is shown in greater detail and partly in section the variable transmission 16 previously referred to. Fundamentally, variable transmission 16 comprises a pair of pulleys 200 and 202, the rotations of which are mutually transmitted by means of belt means comprising a rigid metal ring 204. It will be understood, of course, that a flexible belt may be employed instead of metal ring 204. Accordingly, the term "belt means" as used herein is intended to include either a flexible belt or a rigid belt of the type of metal ring 204. Although a flexible belt can be employed, the circular metal ring is distinctly advantageous, since in instances of extreme ratios of revolution, the area of contact between the circular ring and pulleys near their respective axes will be greater than between a flexible belt and pulleys. As a result, a transmission of given power output rating can be made more compact when using a circular ring.

The pitch diameter of each of pulleys 200 and 202 is adjustable by moving pulley components 202a and 200a toward or away from opposing pulley components 202b and 200b on shafts 205 and 207. Movement of pulley components 202a and 204a is accomplished by movement of pistons 206 and 208, to which the movable pulley components are attached. Pistons 206 and 208 are slidable respectively in cylinders 210 and 212. Pulley components 200b and 202b are not slidable along the axes of rotation. Pulley components 202a and 202b rotate at the same speed about a common axis, as do pulley components 200a and 200b. Each of pistons 206 and 208 is provided with an operating lug extending outwardly through an elongated slot in the side of cylinders 210 and 212. Piston 208 is caused to slide by means of a lever 500 connected to the operating lug associated with said piston. Lever 500 is pivotally mounted on a fulcrum 502 (Figure 18). Lever 500 is in turn caused to move by the balance of the mechanical linkage or drive train illustrated in Figure 18, originating in crank plate 82 and motor 104. Movement corresponding to that of piston 208 is imparted to piston 206 by means of a tie-rod 211 connecting the piston 208 with piston 206 and passing through the housing of transmission 16. Corresponding movement in the same direction by pistons 206 and 208 produces an inverse variation in the pitch diameter of pulleys 200 and 202, and as a consequence, in the ratio of rotations of shafts 18 and 19. Torque from the output shafts 8 and 8' of meters 6 and 6' are transmitted through variable transmission 16 by means of shafts 18 and 19.

In the position illustrated, a given number of rotations by shaft 18 and associated pulley 202, for example, one rotation, will produce a greater number of rotations, say for example 9.9 rotations, in pulley 200 and shaft 19. Inward movement of piston 208 and pulley component 200a will cause a corresponding outward movement of pulley component 202a and piston 206. As such movement takes place, the ratio of revolutions of shafts 18 and 19 will change, in this instance from 1:9.9, and gradually approach 1:1, and then gradually the opposite extreme, in this instance, 9.9:1. Since the bevelled inner periphery of ring 204 is smooth and bears upon the smooth surfaces of pulleys 200 and 202, the change from one extreme ratio to another can be made in a substantially infinite number of increments, within the extreme structural limits, or design limits of the transmission. Transmission 16 provides a rigid, non-slipping, mechanical linkage between the meter output shafts 8 and 8' that locks the meters in the desired ratio of rotations, so that at any rate of flow, regardless of variations in the relative pressure differentials across the meters, the proportion of the liquid passed through one meter with respect to that passed through the other meter will be exactly the same. If one meter should tend to lose speed relative to the other, the faster meter will tend to act as a motor for the slower. If one meter tends to gain speed relative to the other, the slower meter will act as a brake for the faster.

The use of a transmission having an infinite number of increments within the extreme limits provided by the design of the device provides an important advantage over the use of fixed increment or stepwise power transmission means. This is true, since, for example, blending identical proportions of various gasolines of given, different octane numbers will not always produce a blend having the same octane number. Different gasoline stocks have different lead responses, so that all stocks are not upgraded in the same degree by incorporating therein the same amount of tetraethyl lead. Thus, for example, where it is found that the proportion of six parts of one stock to four of another provides a blend having the desired octane rating, when one or both of the stocks are changed, different proportions may be required to obtain a blend having the same octane rating as the first blend, notwithstanding that the new stocks possess the same individual octane ratings as those first mentioned. Since the degree of correction of proportions required may not coincide with the fixed increments of a stepwise transmission, the use of a stepwise transmission can result in the dispensing of liquid blends of varying quality.

As mentioned previously, shafts 18 and 19 have incorporated therein normally engaged clutch means 30 and 32. Clutch means 30 and 32 are adapted to be disengaged by the aforesaid lever 500, when the lever is at its respective extremes of travel. The respective clutch means are disengaged by the action of lever 500 and yoke 209, associated therewith, upon vertical, pivotally mounted clutch levers 501 and 213. In the present embodiment, only one of the clutches is disengaged at one time. Simultaneously with disengagement of one of the clutch means, one of a pair of master microswitches 504 and 506 shown in Figure 18 is opened, or depressed, by an arm 504a or 506a projecting from and mounted on rotating shaft 508, thus cutting off the source of electrical power to one of the pump motors. The other microswitch is adapted to be opened simultaneously with disengagement of the other clutch means. At all intermediate positions of the lever 500, the microswitches are closed, and the clutches 30 and 32 are engaged. Thus, when the proportion selecting means is set to dispense only one component liquid to the exclusion of the other, the clutch means between the transmission 16 and the meter through which no liquid is to be passed is disengaged. Simultaneously, the microswitch that controls the power source to the motor associated with the disengaged meter is opened, and one entire side of the liquid dispensing system is rendered inoperative. When it is desired to dispense the other liquid only, the mechanism operates in a converse manner.

The provision of clutch means and electrical power-interrupting master switch means affords an important advantage in that it eliminates passing the entire volume of liquid being pumped, but not dispensed, through the bypass system around the pump. The latter operation is disadvantageous, since as already indicated, during extended dispensing the bypassed liquid tends to be heated, and this tends to cause partial vaporization of the bypassed liquid. As indicated, partial vaporization of one or both component liquids is undesirable, since it leads to cavitation in the pump associated therewith, and to inaccurate proportioning during subsequent dispensing of blended liquids.

Figures 6 and 7 illustrate in detail an important part of the proportion and price control means previously referred to. As indicated, numeral 60 refers to a drum provided with a plurality of rows of uniformly spaced, threaded holes 62, arranged in groups of four rows each, along the longitudinal axis of the drum 60. Each row of holes 62 is adapted to receive a stop screw 250 which in turn is adapted to engage stop lugs on the reverse side of proportion and price controlling rods 70, 72, 74 and 76, which constitute proportion and price control traversing means. One such stop lug, 252, on the reverse side of proportion control rod 70 is shown in Figure 6. Control rods 70, 72, 74 and 76 are adapted to slide longitudinally through slots provided in control rod bearing members 254 and 256. The stop screws 250 limit the longitudinal traverse of the price and proportion control rods across the face of drum 60. Proportion control rod 70 is engageable at its opposite end with notched follower 475 (Figure 21), and is adapted to limit the travel of member 475 and crank plate 82 in accordance with its own traverse. As a consequence, it limits the traverse of the drive train that is adapted to cause variable transmission 16 to traverse its entire range of ratios of rotation. Price control rods 72, 74 and 76 are associated respectively at their opposite ends with gear shifting rings 334, 336 and 338 (Figure 9). One price control rod controls the "tens" price indicator wheel and its associated sliding gear in the speed variator 56, another the "units" price indicator wheel and its associated sliding gears, and the third price control rod controls the "tenths" price indicator wheel and its associated sliding gears, through the aforesaid, respective gear shifting rings 334, 336 and 338. Numeral 266 denotes a circular plate mounted coaxially on a shaft 64, and adapted to engage a forked portion of member 98 which is mounted at its base on switch rod 100. Numeral 66 refers to a locking pin mounted vertically on shaft 64. Pin 66 is adapted to engage the notches of notched, flanged disc 68, which is fixedly mounted. Numeral 258 denotes a cable and pulley linkage linking shaft 64 and the blend indicating dial shaft 262, the former having spool 260 mounted thereon.

To preset the desired proportion of dispensed product, a stop screw 250 is placed in one of the threaded holes 62 in the top, or proportion controlling row of a group of four rows of holes in drum 60. It will be understood that all of holes will have been previously calibrated to determine the liquid proportions delivered thereby. The price for the blend thus preset is set by appropriately placing one stop screw in each of the next three, or price controlling rows of holes. This is repeated for as many different products, or sets of four rows of holes, as are provided on drum 60. To select a given product and its associated price, after presetting, all that is necessary is to withdraw shaft 64 by means of handle 62 so as to disengage pin 66 from the notch of disc 68. This done, handle 62 is rotated until the desired four rows of holes are behind the proportion and price controlling rods, as will be indicated by the position of blend indicating dial 94. Handle 62 and shaft 64 are then moved inwardly, thereby locking pin 66 in a notch of member 68 and simultaneously switching on motor 104 through a corresponding longitudinal movement of switch rod 100, transmitted through movement of plate 66 and fork 98.

It will be appreciated that the above-described means for controlling prices and proportions is advantageous in that the price set for the various mixed products is mechanically independent from the price set for the respective component liquids and from the proportions of the liquids in the mixed products. Thus, for example, if a given mixed product contains equal proportions of two component gasolines, the price of that product need not be the average of the prices of both components, but can be any price desired, regardless of the price set for the individual components or for mixtures containing other proportions of the same gasolines. This constitutes an important advantage, as an operator need not be placed at a competitive disadvantage with respect to one or more dispensed products merely because of lack of flexibility in pricing.

As indicated earlier herein, Figures 8 and 9 comprise respectively a plan view and a rear elevation of automatically-shifting speed variator means 56, including gear shifting means therefor. Figure 10 represents an enlarged portion of Figure 7 showing in detail the mounting of the various ring members. Figure 11 is a detailed drawing, enlarged, of the structure associated with slidable gears 300A. The structure illustrated in Figure 11 functions essentially identically as the structure associated with slidable gears 300B and 300C, although the respective structures are not exactly identically constructed due to the necessity for their adaptation to the available space. Figure 12 is an enlarged fragmentary view of the main variator shaft 302, the stepped gears 304 of varying diameter thereon, and the differential gearing 112 thereabove that is adapted to accumulate the total rotations of secondary shafts 306A, 306B and 306C. Figures 13, 14 and 15 depict respective drive ring support 332, gear shifting ring 334 (considered a typical member of the group of shifting rings 334, 336, and 338) and engagement-controlling ring 340.

Referring now to this series of figures in detail, first with particular respect to Figure 9, numerals 300A, 300B and 300C denote gears vertically slidable with respect to secondary shafts 306A, 306B and 306C that are disposed adjacent to main shaft 302. As is well understood, the general function of the speed variator means is to multiply the rotation of shaft 52, which is proportional to the total volume of dispensed liquid, by a factor corresponding to the price per unit volume of the dispensed product, said factor being determined by the elevation of slidable gears 300A, 300B and 300C (corresponding to the tenths, the tens, and units digits of the price per gallon), and to obtain thereby a total rotation in gear 392 that is proportional to the total price of the product dispensed. Gear 392, in turn, drives a cost register which registers the price of the sale in dollars and cents.

Continuing with Figure 8, numeral 308A refers to an elevation control member, similar in structure to members 308B and 308C, slidably mounted at its base on shaft 321A and having a forked portion at its other end adapted to engage a flanged portion of bearing support 301A of slidable gears 300A. Similarly functioning structure is found at 308B, 308C, 321B, 321C, 301B and 301C. Numerals 320A, 320B and 320C refer to roller members adapted to engage the inclined surfaces 326A, 326B and 326C. Numerals 322A, 322B and 322C refer to vertically positioned notched racks adapted to engage spring-impelled pawls 323A, 323B and 323C, which members are associated with bearing support members 301A, 301B and 301C. Numerals 310A, 310B and 310C refer to engagement-controlling levers adapted to effect the engagement and disengagement of gears 300A, 300B and 300C with stepped gears 304, by pivotally swinging the slidable gears inwardly or outwardly toward main shaft 302. Numerals 312A, 312B and 312C refer to horizontally positioned locking racks adapted to engage a turned-down pawl-portion of levers 310A, 310B and 310C. Horizontal racks 312A, 312B and 312C are pivoted respectively at 314A, 314B and 314C. Racks 312A, 312B and 312C are urged into engagement with levers 310A, 310B and 310C by means of resilient spring members 316A, 316B and 316C. Numerals 318A, 318B and 318C denote pins mounted horizontally on the outside of racks 312A, 312B and 312C. Pins 318 are adapted to control the engagement of racks 312 with levers 310, by engagement with notches 319 (Figure 15) located on the lower surface of engagement-controlling ring member 340. Spring members 324A, 324B and 324C are associated with levers 310A, 310B and 310C and normally tend to urge slidable gears 300A, 300B and 300C into engagement with the stepped gears 304 on shaft 302.

Numerals 326A, 326B and 326C denote inclined planes mounted normal to the planes of gear shifting rings 334 and 336 and 338. As indicated previously, inclined planes 326A, 326B and 326C are adapted to engage rollers 320A, 320B and 320C. As will be seen the elevation of gears 300A, 300B and 300C on secondary shafts 306A, 306B and 306C is determined by the elevation at which the rollers engage the inclined planes. In turn, the elevation at which rollers 320 engage inclined planes 326 is determined by the relative position of the gear shifting rings, that is, by the extent to which gear shifting ring members 334, 336 and 338, on which inclined planes 326 are mounted, are rotated.

A pin 315A is mounted in the variator base and is provided with an upwardly extending portion adapted to engage adjacent teeth in the larger of slidable gears 300A, when gears 300A are in their lowermost position. Pin 315A prevents gears 300A from turning when the gears 300A are in the neutral or zero position. Similarly functioning pins 315B and 315C are provided for gears 300B and 300C.

Numeral 354 refers to a horizontally positioned, semicircular toothed rack mounted on the upper surface of drive ring 330. Numeral 356 denotes a pinion gear meshing with rack 354 and adapted to drive rack 354, and drive ring 330 associated therewith, in a counterclockwise direction. Numeral 348 refers to a latch support member mounted on the lower surface of primary drive ring 330. Numeral 352 refers to a lever associated with engagement-controlling ring member 340 and adapted to engage the notch in the latch 350 which is pivotally mounted on latch support member 348 (Figure 9). Numeral 364 refers to a resilient spring member mounted at one end upon the pin attached to the framework or variator 56 and at the other with a pin associated with primary driving ring 330. Spring member 364 is adapted to return driving ring 330 in a clockwise direction after the gear shifting operations are complete.

Numeral 333 designates a pin mounted beneath the driving ring 330 and adapted to engage levers 337A, one of which is integrally mounted on each of rings 334, 336 and 338, one above the other. Pin 333 is forward of levers 337 during counterclockwise travel of the drive ring 330 but on the clockwise return of drive ring 330, pin 333 engages levers 337A thereby causing the rings associated with the levers to return to the starting position along with drive ring 330.

Numeral 360 denotes a pin mounted on and extending beneath driving ring 330. Three elongated finger members 362A, 362B and 362C are pivotally mounted at their bases on pin 360. Finger members 362 are urged into slidable engagement with the outer peripheries of gear shifting rings 334, 336 and 338 by resilient spring member 364. Finger members 362A, 362B and 362C are adapted to engage notches 377 (Figure 14) positioned on the outer periphery of each of gear shifting rings 334, 336 and 338. Numeral 372 refers to a lever pivotally mounted on pin 373 associated with gear shifting ring 334 and adapted to depress one end of a finger-releasing lever 374 that is pivotally mounted at 376. Lever 372 is connected at its opposite end to price control rod 72. When price control rod 72 can traverse no further due to engagement of the stop lug on the reverse face thereof with a stop screw 250 positioned in the face of drum 60, lever 372 is caused to pivot in a clockwise direction around pivot 373, whereby the adjacent end of finger release lever 374 is depressed inwardly toward the center of the variator. Inward depression of one end of lever 374 causes the other end to move outwardly. The outward moving end of finger-release member 374 engages the end of finger member 362A, forcing it out of engagement with notch 377. Finger-release structure essentially identical with that described and shown on ring 334 is provided for on similarly constructed gear shifting rings 336 and 338. During the remainder of the travel of drive ring 330, if any, the ends of finger members 362A, 362B and 362C merely ride on the smooth surfaces of the gear shifting rings.

As indicated in Figures 9 and 10, the various ring members are adapted to rotate in the same plane by engagement with a plurality of flanged rollers 344 and 346 mounted at appropriate levels on shafts 342 and 343.

Referring to Figure 12, the rotation of gear 370B is transmitted to gear 392 through meshing gear 376, integrally associated gear 378 mounted coaxially with gear 376, and planet gears 380a, 380c, 380b, and 380d. Planet gears 380a, 380c, 380b and 380d also receive and add the rotations of gear 370C transmitted through meshing gear 394 which has mounted thereon the axes of integral planet gears 380a and 380c and 380b and 380d. The total rotations of gears 370B and 370C are therefore accumulated in gear 382 and in integrally associated gear 384 mounted coaxially therewith. The rotations of gear 384 are transmitted to lower planet gears 386a and 386b. The rotation of gear 370A is added in the planetary gears by passage into gear 396 which has mounted thereon the axes of integral planet gears 386a and 386c and 386b and 386d. The total rotations of gears 370A, 370B and 370C are therefore passed from upper planet gears 386c and 386d into gear 390 and thence into integrally associated gear 392 mounted coaxially with gear 390.

It will be understood that the stepped gears 304, the slidable gears 308A, 308B and 308C, shafts 306A, 306B and 306C, intermediate gears 370A, 370B and 370C, and differential gearing 112, as such, are of known construction, examples of constructions suitable for the purposes of this invention being those described in U.S. Patent No. 2,111,996, issued March 22, 1938, to Edward A. Slye.

Figures 16, 16a and 17 illustrate a portion of the drive train for driving pinion gear 356 and rack 354 and drive ring 330 associated therewith. Referring now to these figures in detail, numeral 109 designates the input shaft of speed reducer 102. Numeral 108 denotes a drive gear mounted on shaft 109. Drive gear 108 is adapted to mesh with driven gear 402 mounted on shaft 403. Numeral 416 denotes a plate member mounted on shaft 403 and adapted to be engaged by pivotally mounted fork member 418. Fork member 418 is mounted on snap-acting pivot 421. Pivot 421 is pivoted by the action of pin 118 (Figure 16a) on lever 415, link 417, and lever 419. Numeral 400 denotes a clutch means associated with driven gear 402 and shaft 403. A collar 401 provided with drive lugs 405 is fixed to the other end of shaft 403. When the drive lugs 405 of collar 401 engage the notches of bearing 409, driven shaft 403 transmits rotational motion from gear 402 to gear 406. The rotation of gear 406 is passed through idler gear 408 to gear 110 and thence to pinion gear 356 mounted coaxially with gear 110. Numeral 412 refers to a centrifugal brake means adapted to reduce the speed with which drive ring 330 and the other rings carried therewith are returned in a clockwise direction to their starting positions by spring member 364.

In the operation of the variator drive train pin 118, on the lower surface of rotatable crank plate 82 engages a lever 415 and associated link 417, and lever 419, which in turn causes pivot 421 and associated fork 418 to pivot counterclockwise, thus moving plate 416 and shaft 403 toward the clutch 400, whereby lugs 405 and notches 407 are meshed. Engagement of the variator drive train, and more particularly, rotation of pinion gear 356, causes rack 354 and the drive ring 330 associated therewith to rotate in a counterclockwise direction. During the initial portion of the travel of the drive ring 330, lever 352 and the engagement-controlling ring 340 associated therewith is carried with the drive ring 330 by means of engagement of lever 352 with latch 350 mounted on latch-supporting member 348 located beneath drive ring 330.

During the first portion of travel of engagement-controlling ring 340, pins 318, originally in register with notches 319, are depressed by ring 340, thereby disassociating horizontal rack members 312 from the pawls on lever 310. After depression of pins 318, pins 311 positioned on the upper surface of ring 340 engage levers 310 causing the associated stirrup members and slidable gears 300 to pivot in a counterclockwise direction, thereby disengaging the slidable gears 300 from stepped gears 304. After slidable gears 300 have been swung fully outward by engagement of levers 310 with pins 311, a small additional torque applied to racks 322 through levers 310, said slight torque corresponding to the last portion of travel of lever 352 toward the rear surface of the notch of latch 366, causes release of the spring-impelled pawls that engage racks 322, whereby slidable gears 300 can drop to the neutral position.

At this time, a stop 329 (Figure 1) engages lever 121 (Figure 20), whereby the drive ring 330 temporarily can move no further. During this period drive gear 108 is still turning and applying torque to gear 402. Since the drive ring and associated variator drive train cannot turn due to the engagement of stop 329 and lever 121, clutch means 400 slips. During this period, however, crank plate 82 continues its rotation until a pin 118 located on the lower side thereof engages and depresses a lever 116 which pivots lever 121, thereby releasing stop 329 and drive ring 330. After stop 329 is released, drive ring 330 can continue its counterclockwise travel. The operation just described provides a slight delay in the shifting operation. The slight delay is provided to permit sliding gears 300A, 300B and 300C to drop to the bottom of shafts 306A, 306B and 306C, before rollers 320 are engaged by inclined planes 326. After the slidable gears 300 have dropped to a neutral, disengaged position, latch 350 is tripped whereby lever 352 is released therefrom and deposited in the notch of latch 366.

During the next portion of counterclockwise travel of drive ring 330, elongated finger members 362A, 362B and 362C engage notches 377 positioned in the outer edges of gear shifting rings 334, 336 and 338, causing a corresponding movement in the latter. As gear shifting rings 334, 336 and 338 move in a forward, or counterclockwise, direction inclined planes 326A, 326B and 326C engage rollers 320A, 320B and 320C respectively, thereby elevating the rollers and the slidable gears 300A, 300B and 300C that are associated therewith. As indicated previously, the counterclockwise travel of gear shifting rings 334, 336 and 338, and consequently, the elevation of slidable gears 300A, 300B and 300C, are limited by price control rods 72, 74 and 76. When gear shifting rings 334, 336 and 338 can move no further due to the limitation of the traverse of respectively connected price control rods 72, 74 and 76, the finger-release mechanism, comprising levers 372 and 374, is tripped, thus disengaging finger members 362A, 362B and 362C from notches 377. During the remainder of the travel of drive ring 330, if any, the ends of finger members 362A, 362B and 362C merely slide on the smooth outer surfaces of gear shifting rings 334, 336 and 338.

At the end of the counterclockwise travel of drive ring 330, a pin 331 mounted thereon engages fork 418 and pivots the latter clockwise, causing longitudinal movement of plate 416, shaft 403, collar 401 and lugs 407, whereby the variator drive train is disengaged from the variator. The action of spring 364, now under tension, causes drive ring 330 to return to its original position. During the clockwise return of drive ring 330, pin 333 mounted thereon engages levers 337A causing gear shifting rings 334, 336 and 338 to travel in a clockwise direction therewith. As gear shifting rings 334, 336 and 338 are returned to their original positions, price control rods 72, 74 and 76 associated respectively therewith are returned to their original positions. It is noted that during the return travel of ring 330, rocking latch 366 is tripped, thereby permitting lever 352 to be disengaged therefrom and carried along with latch 350. As engagement-controlling ring 340 is caused to return to its original position, pins 311 are withdrawn from engagement with levers 310A, 310B and 310C. Slidable gears 300A, 300B and 300C are then urged into engagement with stepped gears 304 by spring members 324A, 324B and 324C. It will be understood that the slidable gears 300 are maintained at their proper elevations on shafts 306, after removal of inclined planes 326, by means of engagement of spring impelled pawls 323 with racks 322.

During the last portion of the clockwise return travel of engagement-controlling ring 340, pins 318A, 318B and 318C come into register with notches 319A, 319B and 319C and are thereby released from depression by engagement-controlling ring 340. Spring members 316A, 316B and 316C then urge horizontal rack members 312A, 312B and 312C into engagement with the turned-down pawl portions of levers 310A, 310B and 310C thereby locking the slidable gears 300 into engagement with the stepped gears 304.

After the variator drive train has been disengaged, the notched follower 475, rotating with the crank plate shaft, engages pin 420. The counterclockwise motion of member 475, crank plate 82, and the variable transmission drive train continue until limited by engagement of stop lug 252, mounted on the reverse side of proportion control rod 70, with stop screw 250. At this point notched follower member 475 is cammed upwardly by pin 120 which is now held stationary. Proportion control rod 70 is now returned to its starting position by a spring (Figure 20), not numbered. The upward movement of member 475 forces the switch plate 476 up and turns off motor 104. At this point, the switch plate 476 is no longer being restrained in the down position due to the fact that during the counterclockwise travel of crank plate 82 a pin 478 extending outwardly from the edge of crank plate 82 has engaged and raised cam 115 which supports cam 114, thus raising cam 114 on pivot 479. After cam 114 is raised, pin 450 (Figure 20a) mounted on switch rod 100, and the switch plate lever 451 associated therewith, are no longer forced downwardly against the upper surface of the switch plate 476, whereby the switch plate 476 can be raised by the action of notched follower member 475 on the lower surface thereof. Cam 114 is maintained in an elevated position by cam 115, until the latter is returned to the position shown in Figure 20 by the action thereon of a collar 115a mounted on switch rod 100, when switch rod 100 is moved to the left at the beginning of another delivery cycle. After cam 114 has been lowered to the position illustrated in Figure 20, the apparatus is ready to commence another delivery.

In Figure 23 there is shown an adapter unit for use in connecting parallel, liquid dispensing hoses to a conventional, manually controlled dispensing nozzle. In operation the different component liquids, in proportions governed by variable transmission 16, pass from meters 6 and 6' into hoses 15 and 15' and thence into the adapter housing 530. The respective liquids under pressure from pumps 2 and 2' force open check valves 525 and 526 and flow into mixing chamber 531. Check valve 525 and 526 effectively prevent backflow of liquid from the mixing chamber into the respective dispensing hoses 15 and 15'. By placing the check valves relatively near the dispensing nozzle, only a small volume of the liquid dispensed during one sale is carried over to the next. Specifically, only the volume of liquid contained in mixing chamber 531 and in the base of the dispensing nozzle will be carried over. From mixing chamber 531 the liquid to be dispensed flows through threaded adapter outlet 527 on which is mounted the threaded base 528 of manually controlled dispensing nozzle 550. Any suitable dispensing nozzle construction can be used. A typical manually operable dispensing nozzle is illustrated in Figure 25. The valve within nozzle 550 can be operated by means of lever 551 which when pressed toward the nozzle housing causes the self-closing valve within the housing to open. The internal construction of a suitable dispensing nozzle is described in United States Patent No. 1,870,918, issued August 9, 1932, to J. A. Logan.

Taking up the over-all functioning of the herein disclosed apparatus, the liquid proportions and the price per unit volume for a plurality of products are preset by appropriate adjustment of stop members 250 on the face of price control drum 60. When the product to be dispensed is the same as that dispensed during the immediately preceding sale the dispensing apparatus is ready to operate, and after resetting the cost and volume registers 58 and 54 by operation of lever 88, the pumps 2 and 2' can be started by operation of lever 91. As long as the dispensing valve in dispensing nozzle 550 is not open liquid passed through both pumps will be recycled entirely through the pressure-relief operated bypass system. As soon as lever 551 of nozzle 550 is depressed whereby the dispensing valve is opened, the liquids will be diverted from the bypass systems through the meters in the relative proportions permitted by variable transmission 16, and at a rate permitted by the dispensing valve.

However, assuming that the product to be dispensed is different from that dispensed during the immediately preceding sale, the new product is first selected by withdrawing product selector handle 62. This motion frees locking pin 66 from notched disc 68 whereby drum 60 is free to rotate with product selector handle 62. The drum is rotated until the proper series of holes corresponding to the liquid proportions and price of the product to be dispensed are behind the proportion and price control rods 70, 72, 74 and 76, as indicated by the position of blend selector dial 94. At this point product selector handle 62 is pushed inward, thus engaging locking pin 66 with notched disc 68, whereby drum 60 is locked in position. The inward movement of product selector handle 62 is transmitted to switch rod 100 through plate 266 and fork 98. As switch rod 100 is moved inwardly pin 450 is cammed inwardly and downwardly by cam 114, at the same time depressing switch lever 451 (Figures 20 and 20a). Depression of switch lever 451 depresses switch plate 476 (Figure 22), thus causing motor 104 to be started. Motor 104 constitutes drive means adapted to drive both the drive train that is associated with the variable transmission and the drive train that is associated with the variator.

The rotation of the output shaft of motor 104 is transmitted to speed reducer 102 via belt and pulley system 106 and shaft 109. The speed reducer 102 in turn drives an output shaft positioned therebeneath to which there is attached notched follower 475 (Figures 21 and 22), and crank plate 82. After about one-third of a turn by the crank plate 82, during which the variable transmission drive train is also traversing, pin 84 located beneath crank plate 82 engages lever 415 (Figure 16a) which in turn causes fork 418 (Figures 16 and 17) to pivot in a counterclockwise direction, thus causing plate 416 and shaft 403 to be moved toward clutch 400. Movement of shaft 403 toward clutch 400 causes engagement of drive lugs 405 with notches 407 (Figures 16 and 17), whereby the variator drive train is engaged and is rendered operative. Prior to engagement of the variator drive train, gear 108 mounted on the input shaft 109 of speed reducer 102 has been turning causing meshing gear 402 mounted on shaft 403 to rotate. After engagement of shaft 403 with the bearing 409 of gear 406 the rotation of shaft 403 is transmitted to pinion gear 356 through idler gear 408 and meshing gear 110.

Rotation of pinion gear 356 in a clockwise direction causes movement in a counterclockwise direction of semicircular rack 354 and drive ring 330 attached thereto. Movement of the drive ring effects selective engagement of slidable gears 300A, 300B and 300C with gears 304, in a manner described above in detail, the elevation at which slidable gears 300 engage stepped gears 304 being governed in accordance with the traverse of price control rods 72, 74 and 76. As drive ring 330 reaches the end of its counterclockwise rotation pin 331 engages the base of fork 418, causing the same to pivot in a clockwise direction whereby shaft 403 is disengaged from the train of gears that drive pinion gear 356 and rack 354. Drive ring 330 together with the other rings comprising the variator shifting means are caused to return to their original position by spring 364. The return of the various rings to their original positions is slowed by means of centrifugal brake 412.

Meanwhile, rotation of crank plate 82 causes variable transmission 16 to traverse a variety of ratios of rotation through a drive train comprising lever 86 (Figure 19), shaft 508, lever 500 and lever 209 (Figure 18). Movement of lever 500 and connected tie rod 211 causes an inverse variation in the ratio of rotation of the respective shafts of variable transmission 16. As lever 500 reaches its respective extremes it acts upon clutch levers 501 and 503 and 213 and 215, causing disengagement, respectively, of clutch members 32 and 30. Simultaneously with the disengagement of clutch 30 or 32 a member 504a or 506a mounted on shaft 508 engages and opens microswitch 504 or 506, which in turn controls the motor that drives the pump which is connected to the meter through which it is desired that no liquid be dispensed.

After the variator shifting means have returned to their original positions, notched follower 475 picks up pin 120. Rotation of the crank plate then continues until proportion control rod 70 can traverse drum 60 no further due to engagement of its associated stop lug with a proportion control stop member. At this time, the rotation of member 475 is halted due to the connection between proportion control rod 70 and pin 120. Notched follower 475 is now caused to rid up over the rounded surface of pin 120 and to engage the lower surface of switch plate 476, thus turning off motor 104, whereby crank plate 82 and the variable transmission drive train cease to operate.

At this point the dispensing apparatus is set to dispense different liquids in the proportions indicated on the face of dial 94 and at the price per gallon previously preset on drum 60 and indicated on the horizontal price indicator wheels of cost register 54. In order to commence dispensing, reset lever 88 is operated in order to reset the cost and volume registers 54 and 58 to zero. The pump motors 4 and 4' are now started by operation of pump lever 91 and linkage 92. The same motion, through linkage 93, opens a switch in the power line to motor 104 thus preventing any change in the liquid proportions or price per unit volume thereof while the pumps are in operation. As previously explained, where the proportion of one of the different liquids is to be zero, a master switch 504 or 506 will have been opened, thus interrupting the power source to one of the pump motors. As to that motor, operation of lever 91 is ineffective to start the motor.

On depressing lever 551 of dispensing nozzle 550, liquid is caused to pass from pumps 2 and 2' through meters 6 and 6' in the predetermined proportions, and at a rate determined by the extent to which the valve in nozzle 550 is opened. As the liquids are being dispensed it will be appreciated that meters 6 and 6' can rotate only in the ratio determined by the position of pulleys 200 and 202 in variable transmission 16. The excess of liquid that is passed through the pumps 2 and 2' but held back by the limited rotation of meters 6 and 6' and by partial closure of the valve in nozzle 550, is bypassed through the recirculating bypass system provided for each pump. From meters 6 and 6' the different liquids flow through outlets 14 and 14' to parallel hose inlets 15 and 15'. From hoses 15 and 15' the liquids flow into the mixing chamber 531 of adapter 530 and thence out of the system through dispensing nozzle 550.

The rotations of meter output shafts 10 and 10', which are proportional to the volume of the different liquids passed therethrough, are combined as indicated previously in differential gearing 34, which produces a variable output drive in shaft 52 that is proportional to the combined volume of liquid passed through meters 6 and 6'. The rotations of shaft 52 are transmitted directly to main shaft 302 of variator 56. Shaft 302 in turn directly drives volume register 54. By engagement of slidable gears 300A, 300B and 300C at appropriate levels with stepped gears 304, and by collection of the resultant drives in differential gearing 112, the rotations of shaft 302, originally proportional to the combined liquid volume of meters 6 and 6', are converted to a variable drive in gear 392 which is proportional to the preset price per unit volume of the liquid being dispensed. Gear 392 in turn drives a shaft adapted to drive cost register 58. When the sale is complete, lever 551 of dispensing nozzle 550 is released from depression thereby closing the dispensing valve, and pump motors 4 and 4' are turned off by operation of lever 91.

Numerous modifications of the subject invention will suggest themselves to those skilled in the art and may be resorted to without departing from the spirit or scope of this invention. Accordingly, only such limitations should be imposed thereon as are indicated in the appended claims.

We claim:

1. In an apparatus for dispensing different liquids in selected proportions, first and second liquid supply conduits, first and second pump means associated respectively therewith and adapted to cause liquid flow through said conduits, first and second meters associated respectively with said liquid supply conduits and adapted to measure the volume of liquid passed therethrough, a variable transmission connecting said meters and adapted to control the relative proportions of the liquids passed therethrough, a variable drive connected to the first and second meters, the output of said variable drive being proportional to the total volume of liquids passed through said meters, a speed variator connected to said variable drive and adapted to convert the output thereof to an output drive that is proportional to the unit volume price of the total dispensed liquid, adjusting means for adjusting the variable transmission to change the relative proportions of the liquids passed through the first and second meters, and means connected with said adjusting means and with the speed variator for effecting a predetermined change in the output drive of the speed variator relative to the change in the liquid proportions.

2. The apparatus of claim 1 where the variable transmission is substantially infinitely variable between its opposite extreme ratios of rotation.

3. The apparatus of claim 1 where the variable transmission connecting the meters comprises first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and second rotatable shafts.

4. The apparatus of claim 1 where the variable transmission connecting the meters comprises first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and said second rotatable shafts; normally engaged clutch means, operable between said variable transmission and said meter output shafts; normally closed master switch means respectively controlling pumps associated respectively with said meters; means associated with the drive train that is associated with the variable transmission for disengaging said clutch means and a meter associated therewith when the proportion of liquid dispensed through that meter and pump is to be nil, and means associated with the same drive train for concurrently opening the master switch means that controls the pump that is connected with the disengaged meter.

5. In an apparatus for dispensing different liquids in selected proportions, first and second liquid supply conduits, first and second pump means associated respectively therewith and adapted to cause liquid flow through said conduits, first and second meters associated respectively with said liquid supply conduits and adapted to measure the volumes of liquids passed therethrough, a variable transmission connecting said meters and adapted to control the relative proportions of the liquids passed therethrough, a variable drive connected to the first and second meters, the output of said variable drive being proportional to the total volume of liquids passed through said meters, a speed variator connected to said variable drive and adapted to convert the output thereof to an output drive that is proportional to the unit volume price of the total dispensed liquid, said speed variator means including a main shaft having a plurality of gears of different diameter thereon, a plurality of secondary shafts disposed adjacent said main shaft and having gears slidable thereon, the number of secondary shafts and slidable gears corresponding to the number of controllable digits in the unit volume price of the total dispensed liquid, adjusting means for adjusting the variable transmission to change the relative proportions of the liquids passed through the first and second meters and means connected with said adjusting means and with speed variator shifting means for effecting a predetermined change in the output drive of the speed variator relative to the change in the liquid proportions, said speed variator shifting means being adapted respectively to engage said slidable gears with the gears on said main shaft and comprising a plurality of spaced, superposed, reciprocally rotatable annular members positioned about said main and secondary shafts, said annular members including a drive ring adapted to rotate the other rings, a gear shifting ring for each secondary shaft, an engagement-controlling ring; means for engaging said drive ring and said engagement-controlling ring so as to rotate the latter with the drive ring during a portion of the travel of said drive ring; means associated with said engagement-controlling ring adapted to permit engagement and disengagement of the slidable gears of said secondary shafts in accordance with the direction of travel of said engagement-controlling ring; means for disengaging the engagement-controlling ring from the drive ring during another portion of the travel of the latter; means for engaging the drive ring and the gear shifting rings and adapted to rotate the latter with the drive ring during said other portion of travel of the drive ring; an inclined plane associated with and normal to each of said gear shifting rings and adapted to cause the slidable gears to slide along said secondary shafts in relation to the relative positions of said inclined planes during their rotation; means for returning said drive ring, said gear shifting rings and said engagement-controlling ring to their original positions after said slidable gears have been shifted whereby the return motion of said engagement-controlling ring permits engagement of said slidable gears with gears of the main variator shaft.

6. In an apparatus for dispensing different liquids in selected proportions, a speed variator means adapted to convert the rotation of a variable drive that is proportional to the total rotation of a plurality of meters to a variable output drive whose rotation is proportional to the unit price of the product dispensed; a variable transmission connecting said meters and adapted to control relative flow therethrough; proportion and price control means comprising a proportion controlling stop member adjustable to a plurality of positions corresponding to a plurality of proportions of said different liquids, and a price control stop member for each controllable digit of the unit price of the product dispensed, each price control stop member being adjustable to a plurality of positions corresponding to the different digits of said unit price; proportion and price control traversing means adapted to traverse the possible positions of said proportion control and price control stop members and adapted to engage said stop members; drive means comprising a drive train that includes variator shifting means adapted selectively to vary the ratio of rotation between the variable output drive and the variable drive that is proportional to the total rotation of the meters; means connecting the price control traversing means and the aforesaid drive train, said connecting means being adapted to limit the traverse of the variator shifting means in accordance with the traverse of the price control traversing means; drive means including a drive train adapted to cause the variable transmission to traverse its entire range of ratios of rotation; means connecting the proportion control traversing means and the drive train that is associated with the variable transmission, said connecting means being adapted to limit the traverse of said drive train in accordance with the traverse of the proportion control traversing means.

7. In an apparatus for dispensing different liquids in selected proportions, a speed variator means adapted to convert the rotation of a variable drive that is proportional to the total rotation of a plurality of meters to a variable output drive whose rotation is proportional to the unit price of the product dispensed, said speed variator means including a main shaft having a plurality of gears of different diameter thereon, a plurality of secondary shafts disposed adjacent said main shaft and having gears slidable thereon, the number of secondary shafts and slidable gears corresponding to the number of controllable digits in the unit price of the product; a variable transmission connecting said meters and adapted to control relative flow therethrough; proportion and price control means comprising a proportion controlling stop member adjustable to a plurality of positions corresponding to a plurality of proportions of said different liquids, and a price control stop member for each controllable digit of the unit price of the product dispensed, each price control stop member being adjustable to a plurality of positions corresponding to the different digits of said unit price; proportion and price control traversing means including stop lugs adapted to traverse the possible positions of said proportion control and price control stop members and adapted to engage said stop members; drive means comprising a drive train that includes variator shifting means adapted selectively to engage the slidable gears with the gears on said main variator shaft; said drive means being adapted to cause the variator shifting means to traverse the entire range of positions of said slidable gears; means connecting the price control traversing means and the aforesaid drive train, said connecting means being adapted to limit the traverse of the variator shifting means in accordance with the traverse of the price control traversing means; drive means including a drive train adapted to cause the variable transmission to traverse its entire range of ratios of rotation; means connecting the proportion control traversing means and the drive train that is associated with the variable transmission, said connecting means being adapted to limit the traverse of said drive train in accordance with the traverse of the proportion control traversing means.

8. The apparatus of claim 7 where the variable transmission is substantially infinitely variable between its opposite extreme ratios of rotation.

9. The apparatus of claim 7 where the variable transmission connecting the meters comprises first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and second rotatable shafts.

10. The apparatus of claim 7 where the variable transmission connecting the meters comprises first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and said second rotatable shafts; normally engaged clutch means, operable between said variable transmission and said meter output shafts; normally closed master switch means respectively controlling pumps associated respectively with said meters; means associated with the drive train that is associated with the variable transmission for disengaging said clutch means and a meter associated therewith when the proportion of liquid dispensed through that meter and pump is to be nil, and means associated with the same drive train for concurrently opening the master switch means that controls the pump that is connected with the disengaged meter.

11. The apparatus of claim 7 where the variator shifting means for selectively engaging the slidable gears of the secondary shafts with the gears on the main shaft comprises a plurality of spaced, superposed, reciprocally rotatable annular members positioned about said main and secondary shafts, said annular members including a drive ring adapted to rotate the other rings, a gear shifting ring for each secondary shaft, an engagement-controlling ring; means for engaging said drive ring and said engagement-controlling ring so as to rotate the latter with the drive ring during a portion of the travel of said drive ring, means associated with said engagement-controlling ring adapted to permit engagement and disengagement of the slidable gears of said secondary shafts in accordance with the direction of travel of said engagement-controlling ring; means for disengaging the engagement-controlling ring from the drive ring during another portion of the travel of the latter; means for engaging the drive ring and the gear shifting rings and adapted to rotate the latter with the drive ring during said other portion of travel of the drive ring; an inclined plane associated with and normal to each of said gear shifting rings and adapted to cause the slidable gears to slide along said secondary shafts in relation to the relative positions of said inclined planes during their rotation; means for returning said drive ring, said gear shifting rings and said engagement-controlling ring to their original positions after said slidable gears have been shifted whereby the return motion of said engagement-controlling ring permits engagement of said slidable gears with gears of the main variator shaft.

12. In an apparatus for dispensing different liquids in selected proportions, a speed variator means adapted to convert the rotation of a variable drive that is proportional to the total rotation of a plurality of meters to a variable output drive whose rotation is proportional to the unit price of the product dispensed, said speed variator means including a main shaft having a plurality of gears of different diameter thereon, a plurality of secondary shafts disposed adjacent said main shaft and having gears slidable thereon, the number of secondary shafts and slidable gears corresponding to the number of controllable digits in the unit price of the product; a variable transmission connecting said meters and adapted to control relative flow therethrough; proportion and price control means comprising a proportion controlling stop member adjustable to a plurality of positions corresponding to a plurality of proportions of said different liquids, and a price control stop member for each controllable digit of the unit price of the product dispensed, each price control stop member being adjustable to a plurality of positions corresponding to the different digits of said unit price; proportion and price control traversing means including stop lugs adapted to traverse the possible positions of said proportion control and price control stop members and adapted to engage said stop members; drive means comprising a drive train that includes variator shifting means adapted selectively to engage the slidable gears with the gears on said main variator shaft, said drive means being adapted to cause the variator shifting means to traverse the entire range of positions of said slidable gears; means connecting the price control traversing means and the aforesaid drive train, said connecting means being adapted to limit the traverse of the variator shifting means in accordance with the traverse of the price control traversing means; drive means including a drive train adapted to cause the variable transmission to traverse its entire range of ratios of rotation; means connecting the proportion control traversing means and the drive train that is associated with the variable transmission, said connecting means being adapted to limit the traverse of said drive train in accordance with the traverse of the proportion control traversing means; normally engaged clutch means operable between said variable transmission and said meters, normally closed master switch means respectively controlling pumps associated respectively with said meters; means associated with the drive train that is associated with the variable transmission for disengaging said clutch means and a meter associated therewith when the proportion of liquid dispensed through that meter and pump is to be nil, and means associated with the same drive train for concurrently opening the master switch means that controls the pump that is connected with the disengaged meter.

13. Means adapted for use in apparatus for dispensing different liquids in selected proportions, comprising a variable transmission operatively associated with first and second meters and adapted to control the flow therethrough by controlling the relative ratio of rotation thereof, drive means including a drive train adapted to cause the variable transmission to traverse its entire range of ratios of rotations, normally engaged first and second clutch means operable between said variable transmission and the meters associated therewith, first and second master switch means controlling first and second pumps connected respectively with the meters, means associated with said drive train for disengaging said clutch means and a meter associated therewith when the proportion of the liquid dispensed through that liquid and pump is to be nil, and means also associated with the drive train for concurrently opening the master switch means that controls the pump that is connected with the disengaged meter.

14. The apparatus of claim 13 where the variable transmission connecting said meters comprises first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and second rotatable shafts.

15. Means adapted for use in apparatus for dispensing different liquids in selected proportions, comprising a variable transmission operatively associated with first and second meters and adapted to control the flow therethrough by controlling the relative ratio of rotation thereof, drive means including a drive train adapted to cause the variable transmission to traverse its entire range of ratios of rotations, normally engaged clutch means operable between said variable transmission and the meters associated therewith, first and second master switch means controlling first and second pumps connected respectively with the meters, means associated with said drive train for disengaging said clutch means and a meter associated therewith when the proportion of the liquid dispensed through that liquid and pump is to be nil, and means also associated with the drive train for concurrently opening the master switch means that controls the pump that is connected with the disengaged meter, proportion control means comprising a proportion controlling stop member adjustable to a plurality of positions corresponding to a plurality of proportions of said different liquids, proportion control traversing means including a stop lug adapted to traverse the possible positions of said proportion control stop member and adapted to engage said stop member, means connecting the proportion control traversing means and the drive train with the variable transmission and adapted to limit the traverse of the latter in accordance with the traverse of the proportion control traversing means.

16. Means adapted for use in apparatus for dispensing different liquids in selected proportions, comprising a variable transmission operatively associated with first and second meters and adapted to control the flow therethrough by controlling the relative ratio of rotation thereof, said variable transmission connecting said meters comprising first and second rotatable shafts adapted to be driven by output shafts from the meters, a pulley wheel axially mounted on each of said first and second shafts, belt means connecting the pulley wheels, one side of each pulley wheel being movable relative to the other, whereby the pitch diameter of each pulley wheel is variable, means for inversely varying the pitch diameters of the pulley wheels, and consequently, for inversely varying the ratio of revolutions of said first and second rotatable shafts; drive means including a drive train adapted to cause the variable transmission to traverse its entire range of ratios of rotation, normally engaged clutch means operable between said variable transmission and the meters associated therewith, first and second master switch means controlling first and second pumps connected respectively with the meters, means associated with said drive train for disengaging said clutch means and a meter associated therewith when the proportion of the liquid dispensed through that liquid and pump is to be nil, and means also associated with the drive train for concurrently opening the master switch means that controls the pump that is connected with the disengaged meter; proportion control means comprising a proportion controlling stop member adjustable to a plurality of positions corresponding to a plurality of proportions of said different liquids, proportion control traversing means including a stop lug adapted to traverse the possible positions of said proportion control stop member and adapted to engage said stop member, means connecting the proportion control traversing means and the drive train with the variable transmission and adapted to limit the traverse of the latter in accordance with the traverse of the proportion control traversing means.

17. Means adapted for use in apparatus for dispensing different liquids in selected proportions, comprising a speed variator including a main shaft having gears of varying diameter thereon, a plurality of secondary, rotatable shafts disposed adjacent to the main shaft, gears slidable with respect to the secondary shafts and selectively engageable with the gears on the main shaft; differential gearing connecting said secondary shafts and adapted to produce a variable drive proportional to the combined rotations of the secondary shafts; variator shifting means for selectively engaging the slidable gears of the secondary shafts with the gears on the main shaft, comprising a plurality of spaced, superposed, reciprocally rotatable annular members positioned about said main and secondary shafts, said annular members including a drive ring adapted to rotate the other rings, a gear shifting ring for each secondary shaft, an engagement-controlling ring; means for engaging said drive ring and said engagement-controlling ring so as to rotate the latter with the drive ring during a portion of the travel of said drive ring, means associated with said engagement-controlling ring adapted to permit engagement and disengagement of the slidable gears of said secondary shafts in accordance with the direction of travel of said engagement-controlling ring; means for disengaging the engagement-controlling ring from the drive ring during another portion of the travel of the latter; means for engaging the drive ring and the gear shifting rings and adapted to rotate the latter with the drive ring during said other portion of travel of the drive ring, an inclined plane associated with and normal to each of said gear shifting rings and adapted to cause the slidable gears to slide along said secondary shafts in relation to the relative position of said inclined planes during their rotation; means for returning said drive ring, said gear shifting rings and said engagement-controlling ring to their original positions after said slidable gears have been shifted whereby the return motion of said engagement-controlling ring permits engagement of said slidable gears with gears of the main variator shaft.

18. Means adapted for use in apparatus for dispensing different liquids in selected proportions, comprising a speed variator including a main shaft having gears of varying diameter thereon, a plurality of secondary, rotatable shafts disposed adjacent to the main shaft, gears slidable with respect to the secondary shafts and selectively engageable with the gears on the main shaft, differential gearing connecting said secondary shafts and adapted to produce a variable drive proportional to the combined rotations of the secondary shafts; drive means comprising a drive train that includes variator shifting means for selectively engaging the slidable gears of the secondary shafts with the gears of the main shaft, said variator shifting means comprising a plurality of spaced, superposed, reciprocally rotatable annular members positioned about said main and secondary shafts, said annular members including a drive ring adapted to rotate the other rings, a gear shifting ring for each secondary shaft, an engagement-controlling ring; means for engaging said drive ring and said engagement-controlling ring so as to rotate the latter with the drive ring during a portion of the travel of said drive ring, means associated with said engagement-controlling ring adapted to permit engagement and disengagement of the slidable gears of said secondary shafts in accordance with the direction of travel of said engagement-controlling ring; means for disengaging the engagement-controlling ring from the drive ring during another portion of the travel of the latter; means engaging the drive ring and the gear shifting rings and adapted to rotate the latter with the drive ring during said other portion of travel of the drive ring, an inclined plane associated with and normal to each of said gear shifting rings and adapted to cause the slidable gears to slide along said secondary shafts in relation to the relative position of said inclined planes during their rotation; means for returning said drive ring, said gear shifting rings and said engagement-controlling ring to their original positions after said slidable gears have been shifted whereby the return motion of said engagement-controlling ring permits engagement of said slidable gears with gears of the main variator shaft; means for controlling the gears on the main shaft with which the slidable gears of the secondary shafts shall be engaged, comprising a stop member for each of said slidable gears, each stop member being adjustable to a plurality of positions corresponding with the different gears on said main variator shaft, gear-control traversing means including stop lugs adapted to traverse the possible positions of the stop members and adapted to engage said stop members, means connecting the gear-control traversing means and the gear shifting rings, said connecting means being adapted to limit the traverse of the gear shifting rings in accordance with the traverse of the gear-control traversing means.

References Cited in the file of this patent

UNITED STATES PATENTS

| | | |
|---|---|---|
| 1,964,028 | Boynton et al. | June 26, 1934 |
| 2,732,976 | Harks et al. | Jan. 31, 1956 |
| 2,743,843 | Bliss | May 1, 1956 |